(12) United States Patent
Glaser et al.

(10) Patent No.: US 10,282,621 B2
(45) Date of Patent: May 7, 2019

(54) REMOTE STATE FOLLOWING DEVICE

(71) Applicant: Grabango Co., Berkeley, CA (US)

(72) Inventors: William Glaser, Berkeley, CA (US);
Brian Van Osdol, Piedmont, CA (US)

(73) Assignee: Grabango Co., Berkeley, CA (US)

( * ) Notice: Subject to any disclaimer, the term of this patent is extended or adjusted under 35 U.S.C. 154(b) by 0 days.

(21) Appl. No.: 15/644,803

(22) Filed: Jul. 9, 2017

(65) Prior Publication Data

US 2018/0014382 A1 Jan. 11, 2018

Related U.S. Application Data

(60) Provisional application No. 62/360,366, filed on Jul. 9, 2016, provisional application No. 62/360,369, filed on Jul. 9, 2016.

(51) Int. Cl.
*G06K 9/00* (2006.01)
*G06K 9/32* (2006.01)
*G06K 9/62* (2006.01)
*H04L 29/08* (2006.01)
*G06K 9/46* (2006.01)
*H04N 5/225* (2006.01)
*H04N 7/18* (2006.01)
*H05B 37/02* (2006.01)
*G08B 13/196* (2006.01)

(52) U.S. Cl.
CPC ..... *G06K 9/00771* (2013.01); *G06K 9/00335* (2013.01); *G06K 9/00362* (2013.01); *G06K 9/00624* (2013.01); *G06K 9/3258* (2013.01); *G06K 9/46* (2013.01); *G06K 9/6232* (2013.01); *G08B 13/196* (2013.01); *H04L 67/12* (2013.01); *H04N 5/2252* (2013.01); *H04N 5/2257* (2013.01); *H04N 7/18* (2013.01); *H04N 7/183* (2013.01); *H05B 37/0227* (2013.01); *H05B 37/0272* (2013.01)

(58) Field of Classification Search
CPC .... H05B 33/02; H05B 33/08; H05B 33/0869; H05B 37/02; H05B 37/0209; H05B 37/0227; H05B 37/0245; G06K 9/00335; G06K 9/00624; G06K 9/20; G06K 9/2027; G06K 9/22; G06K 9/62; H04N 7/183
See application file for complete search history.

(56) References Cited

U.S. PATENT DOCUMENTS

| 5,254,853 | A | 10/1993 | Reich | |
| 5,418,567 | A | 5/1995 | Boers et al. | |
| 6,970,183 | B1* | 11/2005 | Monroe | G08B 7/062 |
| | | | | 348/143 |
| 9,120,621 | B1 | 9/2015 | Curlander et al. | |
| 9,141,931 | B2 | 9/2015 | Ackerman | |
| 9,412,099 | B1 | 8/2016 | Tyree | |
| 9,426,720 | B2 | 8/2016 | Cohn et al. | |
| 9,892,438 | B1 | 2/2018 | Kundu et al. | |
| 9,948,902 | B1* | 4/2018 | Trundle | H04N 7/183 |

(Continued)

*Primary Examiner* — Jason Crawford
(74) *Attorney, Agent, or Firm* — Alpine Patents, LLC; Brian Van Osdol

(57) ABSTRACT

A system and method for a remote state following device that includes an electronic device with a controllable operating state; an imaging device; and control system that when targeted at a control interface interprets a visual state from the control interface, and modifies the operating state in coordination with the visual state.

35 Claims, 34 Drawing Sheets

(56) References Cited

U.S. PATENT DOCUMENTS

| | | | |
|---|---|---|---|
| 2003/0210340 A1* | 11/2003 | Frederick Romanowich | G08B 13/19632 348/272 |
| 2003/0216969 A1 | 11/2003 | Bauer et al. | |
| 2005/0189411 A1 | 9/2005 | Ostrowski et al. | |
| 2006/0147087 A1 | 7/2006 | Goncalves et al. | |
| 2007/0091177 A1 | 4/2007 | West et al. | |
| 2007/0146873 A1 | 6/2007 | Ortyn et al. | |
| 2008/0226129 A1 | 9/2008 | Kundu et al. | |
| 2008/0228585 A1 | 9/2008 | Duri et al. | |
| 2010/0020173 A1 | 1/2010 | Marquart et al. | |
| 2010/0255902 A1 | 10/2010 | Goldstein et al. | |
| 2010/0295946 A1* | 11/2010 | Reed | H05B 37/0227 348/164 |
| 2011/0215147 A1 | 9/2011 | Goncalves | |
| 2012/0019168 A1* | 1/2012 | Noda | H05B 37/0227 315/307 |
| 2012/0027297 A1 | 2/2012 | Feris et al. | |
| 2012/0173351 A1 | 7/2012 | Hanson et al. | |
| 2013/0103537 A1 | 4/2013 | Hewett | |
| 2013/0147963 A1 | 6/2013 | Henninger et al. | |
| 2013/0177201 A1 | 7/2013 | Fisher | |
| 2013/0290557 A1 | 10/2013 | Baratz | |
| 2013/0317300 A1 | 11/2013 | Berci et al. | |
| 2013/0342688 A1 | 12/2013 | Siu | |
| 2014/0129688 A1 | 5/2014 | Asenjo et al. | |
| 2014/0245160 A1 | 8/2014 | Bauer et al. | |
| 2014/0265880 A1* | 9/2014 | Taipale | H05B 37/0263 315/158 |
| 2014/0279191 A1 | 9/2014 | Agarwal et al. | |
| 2014/0285660 A1 | 9/2014 | Jamtgaard et al. | |
| 2014/0372957 A1 | 12/2014 | Keane et al. | |
| 2015/0012396 A1 | 1/2015 | Puerini et al. | |
| 2015/0019391 A1 | 1/2015 | Kumar et al. | |
| 2015/0029339 A1 | 1/2015 | Kobres et al. | |
| 2015/0039458 A1 | 2/2015 | Reid | |
| 2015/0077787 A1 | 3/2015 | Nishimura et al. | |
| 2015/0077797 A1 | 3/2015 | Kurokawa | |
| 2015/0088694 A1 | 3/2015 | Ackerman | |
| 2015/0097961 A1* | 4/2015 | Ure | G08B 5/223 348/159 |
| 2015/0133190 A1 | 5/2015 | Fisher et al. | |
| 2015/0154973 A1 | 6/2015 | McKenna et al. | |
| 2015/0156332 A1 | 6/2015 | Kandregula | |
| 2015/0163412 A1* | 6/2015 | Holley | G05B 15/02 348/143 |
| 2015/0244992 A1 | 8/2015 | Buehler | |
| 2016/0027262 A1* | 1/2016 | Skotty | G08B 13/19632 340/541 |
| 2016/0037135 A1 | 2/2016 | McSheffrey et al. | |
| 2016/0100086 A1* | 4/2016 | Chien | H04N 5/2256 348/143 |
| 2016/0217388 A1 | 7/2016 | Okanohara et al. | |
| 2016/0224856 A1 | 8/2016 | Park et al. | |
| 2016/0242252 A1* | 8/2016 | Lim | H05B 33/0854 |
| 2016/0254864 A1* | 9/2016 | Mueller | H04B 10/116 398/118 |
| 2016/0270191 A1* | 9/2016 | Ludwig, Jr. | H05B 37/0254 |
| 2016/0345414 A1* | 11/2016 | Nolan | G08C 17/02 |
| 2017/0053171 A1 | 2/2017 | Buehler | |
| 2017/0108236 A1* | 4/2017 | Guan | G05B 19/04 |
| 2017/0123030 A1* | 5/2017 | Hengerer | G06F 3/017 |
| 2017/0169440 A1 | 6/2017 | Dey et al. | |
| 2017/0316656 A1 | 11/2017 | Chaubard et al. | |

* cited by examiner

Visual Data

BVO-5000i Device Model

Configuration

```
label: Heart Monitor
type: Device-model
position: <location>
Device_model: BVO-5000i
Signals: [<signal 1 config>,
         <signal 2 config>,
         ...
         <signal 2 config>]
```

Interface Extraction System

```
Heart Monitor:{
    machine_state: state3,
    signals: [
        signal_1: 32,
        signal_2: 114,
        signal_3: 82,
        ...]}
```

Extracted Interface Rep

REMOTE STATE FOLLOWING DEVICE

CROSS-REFERENCE TO RELATED APPLICATIONS

This Application claims the benefit of U.S. Provisional Application No. 62/360,366, filed on 9 Jul. 2016, and U.S. Provisional Application No. 62/360,369, filed on 9 Jul. 2016, both of which are incorporated in their entireties by this reference.

TECHNICAL FIELD

This invention relates generally to the field of electronic devices, and more specifically to a new and useful system and method for remote state following devices.

BACKGROUND

The adoption of Internet of Things (IoT) products by consumers has long promised to bring enhanced functionality and convenience to users. While there are numerous products on the market, adoption has largely not met expectations. Many products used by consumers are still substantially traditional electronic devices that use traditional user interfaces. There are likely numerous reasons for the slow adoption. As one potential reason, many IoT products rely on a family of products to achieve the benefits. As one example, a connected lighting fixture may depend on a wireless network and often another IoT device with to act as the controller. This example may depend on user configuration of both the IoT light and the IoT controller to achieve desired integration. This example introduces two products (that may need to be purchased separately), that both need to be powered and have a network connection. Managing and purchasing so many products that are restricted to areas with a reliable internet connection can be prohibitive to many people.

As another potential reason, IoT products, while enabling new features such as remote control access, sometimes do not address the basic problems of traditional products. In the lighting fixture example above, often times a user may simply want to position a light switch in a more convenient place in the room than how it was wired during construction. While the IoT solution above could address that problem it is also accompanied by the need to keep the connected light switch powered and for both devices to have a network connection to a network. The IoT solution may introduce more pain-points than it solves for many users. Thus, there is a need in the electronic device field to create a new and useful system and method for remote state following devices. This invention provides such a new and useful system and method.

DESCRIPTION OF THE EMBODIMENTS

Figure 1:
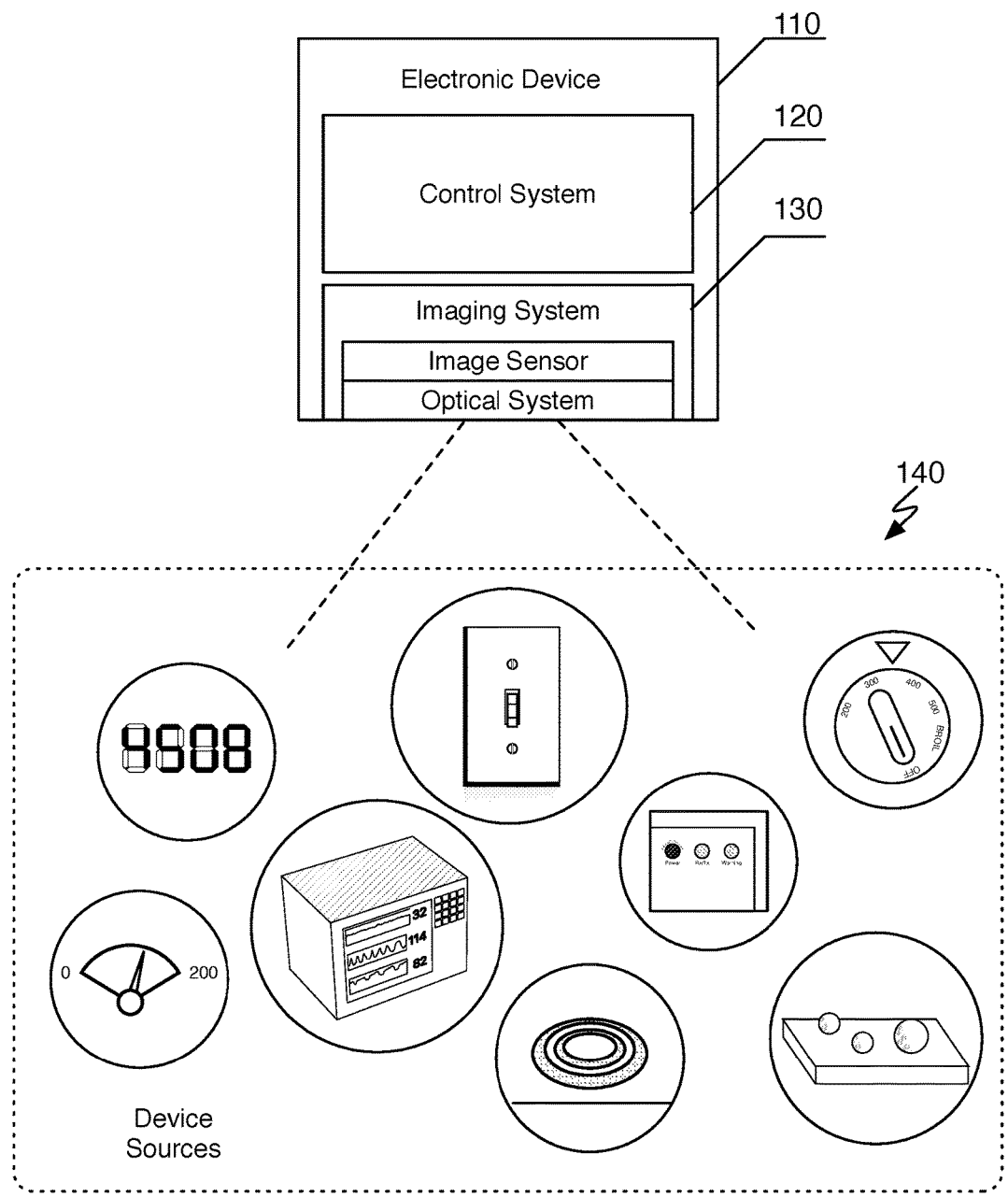
FIG. 1 is a schematic representation of the system and method applied to various types of extraction.

The following description of the embodiments of the invention is not intended to limit the invention to these embodiments but rather to enable a person skilled in the art to make and use this invention.

1. Overview

A system and method for a remote state following device functions to provide a computer vision (CV) based approach to control interfaces of electronic devices. The system and method enable remote integration of one device with that of one or more remote user interfaces. In one preferred embodiment, an electronic device (e.g., a lighting fixture) is connected to an imaging system that collects image data of a user interface (herein referred to as a control interface or more generally a device interface source). A control system can then apply CV-based interpretation of the control interface to extract information from its current state. This extracted information can then be applied to controlling the electronic device. Through the system and method, the electronic device can be integrated with a wide variety of device interface sources to be used as a control interface, independent of the device interface source having needing a network connection or having any direct integration with the electronic device. The system and method may be used in a variety of products including consumer products as well as industrial products such as industrial infrastructure like lighting.

The control interface may be a traditional user interface such as a light switch, a dial, a button, and the like, but could alternatively be alternative forms of a control interface such as a computing device with some user interface presentation of information. There are a vast number of devices, products, and systems that expose information as usability affordances to human users—most devices designed for use by a human are generally accompanied by interpretable representations of information. The system and method preferably apply interface extraction through computer vision in determining some interface state and mapping that to control of an electronic device. A light switch, for example, often has some visual indication of the current light switch state (e.g., on/off). The system and method are preferably applicable for applying computer vision and optionally other forms of perceptual sensing to interface interpretation of a control interface and other ambient information in an environment.

The system and method may be further extended to enable extraction of information from an uncoupled control interface through any visual and/or audio interface including machines with visible machine interfaces. In one preferred embodiment, the system and method utilizes a camera to observe a user interface of a device and convert the user interface output into an extracted interface representation. This extracted interface representation can be a formatted data representation of data or state from the device. Other embodiments can additionally or alternatively utilize a microphone to observe audio based user interface outputs of a device and convert the user interface output into an accessible interface representation used in controlling an electronic device.

As one potential benefit, the system and method can be used for remotely extracting and exposing the interface output of one or more control interfaces. Remote extraction and visual interface translation enables an outside device to be integrated with the system without altering or electronically/communicatively coupling with the outside device. The control interface can be unconnected to the system and could be substantially "uncooperative" in the sense that integration with the system is passive from the perspective of the outside control interface. Additionally, the system and method could be applied to multiple control interfaces and multiple control interface types. For example, legacy equipment, devices with complicated data interfaces, connected devices, and other devices could be integrated with the system as a control interface.

As another potential benefit, the system and method can be used with an unpowered control interface. For example, an unconnected light switch could be used as a control interface without needing to be electrically connected to anything. Control interfaces can be used without depending on a powered controller as with some IoT solutions. Additionally, existing devices, like existing light switches in a home, may be repurposed to be used as the control interface.

As another potential benefit, the system may accommodate a variety of control interface types and variations. A control interface could be an analog and/or a digital user interface. The system and method could interpret and convert user interface elements such as a segmented display, a graphical display, an indicator light, or an analog dial into a digital signal. In some cases, a device interface source may not even be traditionally considered a user interface output but may still convey user interpreted information. For example, the angle of a lock switch can convey the binary state of the lock or the height of a liquid or material in a jar can be a visual representation of content quantity. Accordingly, the system and method could be used with a wide variety of device interface sources including but not limited to: a mercury thermometer, a bi-metal thermometer, an LCD thermometer, an amp meter, a watt meter, a tilt sensor, a shock sensor, a pressure sensor, a flow-rate sensor, a scrolling LED display, a light switch, a dimmer switch, a circuit breaker switch, a door lock latch, an oven dial, other lights or devices, an indicator light, rotary dial, a container of fluid, a container of particulate solids, a handwritten message board, a staging area for objects (e.g., outgoing orders at a restaurant), and/or other sources human interpretable outputs information. Additionally, controller interfaces may be custom designed for enhanced visual interpretation by machines in addition to or in place of humans.

As a related potential benefit, the system and method could additionally be applied for visual interpretation of analog systems in controlling an electronic device. In everyday life, people create systems that have informational significance by how they are perceived by people. As examples, restaurants have systems for conveying what to cook and when orders are ready for customers; offices have systems for filing documents and the stage in the processing of those documents; factories and offices use whiteboards to convey information to employees; and families develop systems for reminding each other of chores to name an exemplary set of situations where analog systems convey information. There may be applications where an electronic device may want to use these analog systems to direct control of an electronic device.

As a related potential benefit, the system and method may accommodate a wide variety of types of generic input sources so that the system and method can be adapted to a variety of data collection applications. There are numerous scenarios where it could be beneficial to have the ability to quickly interface with an existing device—the system and method could offer a set of configuration options such that the system and method could be readily adapted for different applications. Some embodiments, however, may alternatively focus on a single type and/or pre-defined configuration of interface extraction.

As a related benefit, the system and method could enable the use of arbitrarily complex user interfaces for simple devices without compromising the design or cost of the electronic device. An electronic device could have complex interfaces and accommodate a variety of types of control interfaces. This flexibility could be achieved with minimal parts in the electronic device.

As a related potential benefit, the system and method can enable the automatic detection, configuration, and extraction of a device interface source. This can be used for quick setup of an electronic device. For example, lamp using the system and method could automatically pair with a viewed light switch.

As another potential benefit, the system and method may leverage environment monitoring capabilities to enable dynamic response to the context of use of a control interface. For example, a garbage disposal could be preconfigured to activate the garbage disposal only when the control interface is activated and no person is detected in the vicinity of the sink. As another application, control interfaces could be customized for individuals. For example, a TV that monitors a control interface with shortcuts to a user's favorite channels could use facial recognition of user's interacting with the control interface to apply user-customized settings when interpreting the control interface.

As one preferred area of application, the system and method can be implemented as components of a product such that the product can be specifically designed to leverage visual interface translation. For example, a lamp or lighting fixture can include an implementation of the system and method to enable control of the illumination state by an unconnected light switch observed by a camera of the lighting fixture. As discussed, the system and method can provide flexibility, where a variety of types of control interfaces may additionally or alternatively be used to control the product. A user could use light switches of a wide variety of designs and Other household appliances, computing devices, electronic devices, and the like could similarly use functionality of the system and method such as lighting fixtures, fans, simple appliances, air conditioning/heater control systems, TVs, media centers, computing devices (e.g., a desktop computer, tablet, phone, wearable, etc.), and/or any suitable electronic devices.

As a related area of application, the system and method may be implemented as a relay device that communicatively interfaces with one or more electronic devices. For example, the system and method could be integrated into an electrical outlet to control the power state of devices plugged into the device following outlet. In another example, a relay device could implement the system and then communicatively interface with an IoT system, which manages the control of different devices.

2. Overview of Types of Extraction

The system and method may be used for a variety of different types of extractions including physical state extraction, indicator detection, dial extraction, switch extraction, character extraction, presence extraction, gesture detection, and/or device model extraction as shown in FIG. 1. These extraction modes can be applied on any suitable device interface source that can be used as a control interface for an electronic device. These extractions may be used in any suitable combination and could include other types of extraction. Different types of extraction may be used for different types of electronic devices. For example, a lighting fixture may support switch extraction, indicator detection, and dial extraction, and a TV may support presence extraction and gesture detection.

Physical state extraction can comprise a variety of detection approaches. Physical state extraction could be based on color, shape, dimensions, area, volume, appearance, presence, position/location, relative position/location, orientation, or other properties. For example, physical state extraction may be adapted to detect the color of a heating element, and thereby infer its temperature using a black-body radiation curve. Indicator detection and dial extraction are varieties of physical state extraction. Physical state could additionally be applied to graphic interpretation. For example, a line graph generated by some device could be interpreted by converting the graph into a data set.

Indicator detection can be used to detect the binary state or n-state classification of an interface element such as an indicator light, a switch, a circuit breaker, or a lever. Indicator detection can be used for device interfaces with explicit states like a switch, but could also be for natural interfaces like detecting state of a coat on a coat rack or classified states such as a TV on-off state.

Dial extraction can be used to characterize the position of a dial. The dial may be used in signaling information such as a meter. For example, gas meters and/or temperature dials may show measurements through a dial. The dial may alternatively be used as a user input control such as a dial used to set the temperature on an oven. Dial extraction can be used for dials aligned along a radial path or a linear path.

Character extraction can be used to read or detect alpha/numeric characters. Character extraction can be used with digital digit displays (e.g., a segmented display), graphical display of text, printed text, or written text. Character extraction can be customized for a resulting data format.

Presence extraction can be used to detect object presence changes. Presence extraction can additionally be position aware so that an object may be only detected when in a particular region. Alternatively, presence extraction could detect the position and/or orientation of an object or person. Presence extraction could additionally include classification of an object.

Gesture extraction can interpret static gestures or gesture actions performed in association with some device interface source. Gesture interactions performed on, against, in front of, or in proximity to the interaction region can be interpreted as signaling some interpretable information.

Device model extraction can be used to interpret the user interface output of a stateful system such as a computing device with multiple modes of operation. The system and method can handle adjusting visual interface translation in coordination with a currently detected state of a device. This can be used to extract image data from used applications on a computing device. This can also be used for extracting image data from custom device interfaces like medical devices, self-service kiosks (e.g., check-in kiosks, ATM kiosks, etc.), control panels, and the like.

Such forms of extraction can preferably be configured for a particular device interface source. Device interface sources can be configured as being statically located in some location or position. Device interface sources could alternatively be configured for detection within certain regions. In other variations, device interface sources can be configured/processed on-demand through CV-based object classification and/or identification. Device interface sources could additionally be configured for automatic enrollment/configuration and/or manual configuration, as well as using permissions for restricting capabilities of control interfaces, processing image data for extraction, and/or accessing data resulting from extraction.

3. System

As shown in FIG. 1, a system of a preferred embodiment includes an electronic device 110 with a controllable operating state, an imaging system 120, and a control system 130 communicatively coupled to the imaging device 120 and the electronic device 110. The control system 130 can also include a visually monitored interface control mode to interpret visual state of a control interface and modulate the operating state in coordination with the visual state. The system involves at least two main components, the main electronic device implementing the interface extraction (i.e., the interface extraction system) and the control interface. In one implementation, system could be configured to operate on any suitable control interface. In another implementation, the system could include a control interface component as a collective system wherein the control interface may include some features to facilitate pairing, interface extraction, or other forms of functionality within the system.

The system preferably integrates an interface extraction system into the operation of a product or device such that outside user interfaces (in particular visual interfaces) can be used to at least partially control the product or device. These user interfaces can be explicit user interfaces such as a graphical display but could also include functional user interfaces where information is conveyed through appearance such as the position of a light switch. Other mediums of user interfaces such as audio interfaces could additionally or alternatively be used. The system preferably implements the method described herein relating to interface extraction but may alternatively operate in any suitable manner.

The electronic device no of a preferred embodiment functions to provide some functionality responsive to at least one input. The electronic device can be any powered device no such as basic appliances or a computing device.

A basic appliance variation could be a lighting fixture, fan, simple appliance, air conditioning/heater control system, and/or any suitable powered appliance. A lighting fixture can refer to any suitable lighting device such as a lamp, chandelier, sconce, inset lighting, and/or any suitable lighting device. In one particular implementation, the electronic device no could be a light bulb-type device that could be installed in a light-bulb compatible socket. Herein, a lighting fixture or lamp is used as an illustrative example of an electronic device as shown in the exemplary variations of FIGS. 2A-2E, but the system and method could similarly be applied to other products.

Computing device variations could include TVs, media centers, computing devices (e.g., a desktop computer, tablet, phone, wearable, etc.), and/or any suitable electronic devices.

Additionally, new classes of electronic devices can be created through the system. For example, an alarm sensor could be designed to generate alarms, notifications, and/or events in response to the visual state of a control interface.

Figure 3:
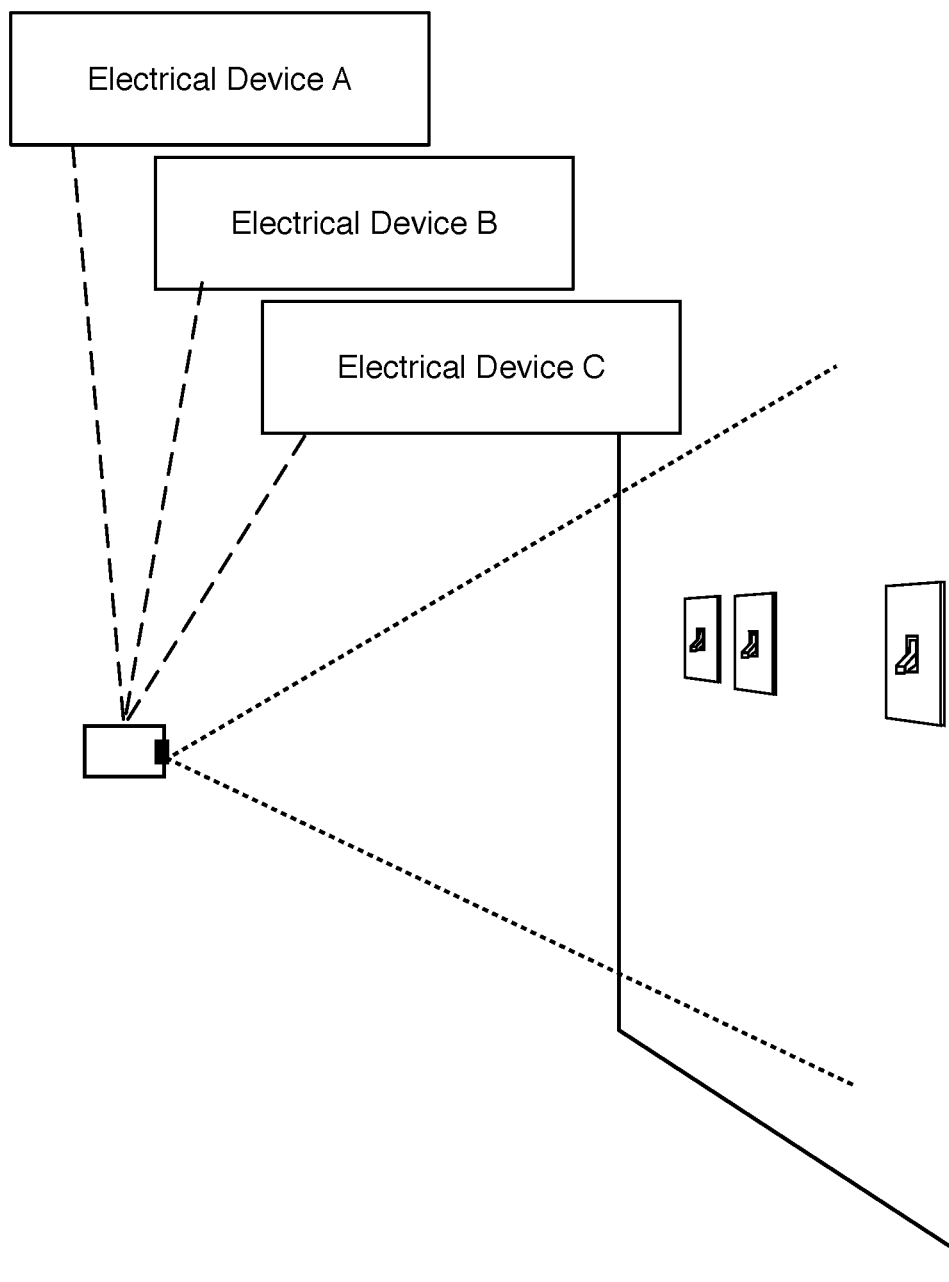
FIG. 3 is a schematic representation of a relay device variation.

Another variation of a type of electronic device 110 could be a relay device where the relay device performs interface extraction and then communicatively or electronically connects to one or more other electronic devices. The relay device variation can functions as an electronic device adapter. In one variation, the relay device could be a power-line controller (e.g., a power strip) that could be used in controlling the on/off state of connected devices. In another variation, the relay device could be a connected computing device used to communicatively control one or more devices. For example, the connected computing device could be a home automation hub (e.g., an audio-based personal assistant product) that can be used in integrating one or more IoT devices as shown in FIG. 3. The system could enable a remote control interface as described herein to be integrated with other network connected devices.

The electronic device 110 preferably has a controllable operating state that can at least partially be controlled by a remote control interface. For some classes of electronic devices, operating state could include two binary states that generally include on and off states. For a lighting fixture, the operating state could be an illumination state. In a basic lighting fixture, the illumination state could include an illuminated state and non-illuminated state. Other operating state variables could include brightness, hue, a timer, and other lighting options. Controllable operating states may alternatively include any suitable number of states (e.g., an n-state device). The controllable operating state may also not be discrete states but could be any suitable dimension of control. Other operating states for other electronic devices may accept a value within a range (e.g., a dimmer switch on a light), alphanumeric value entry (e.g., setting temperature on a thermostat), setting two dimensional position (e.g., setting x and y value of a cursor), and/or other formats of input. The control interface may additionally be used in augmenting operating state by providing general user input. For example, a control interface could be used for menu navigation and general usage of the electronic device 110 (e.g., a controller for a TV).

The electronic device no may include other functionality beyond what is controlled through interface extraction—the control interface may be used to control a subset of functionality of the electronic device no. The electronic device 110 may additionally include other analog and/or digital control inputs. For example, a lamp may additionally include an integrated power switch. Additionally, the electronic device 110 may include any suitable additional components used to facilitate the purpose of the electronic device 110. The control system 130 or other system may coordinate the interpretation of the various inputs with the control interface input.

The imaging system 120 functions to collect media and more preferably to collect image data that may contain a control interface. The imaging system 120 can include one or more imaging devices.

The imaging system 120 preferably captures a selectable target so as to visually interpret a control interface when monitored. The imaging system 120 preferably has a form of imaging resolution sufficient to isolate visual state of a targeted control interface within the field of view of the imaging device. Depending on the use case, the imaging system 120 may use different designs of an imaging device. A preferred embodiment uses a camera imaging device capturing multi-dimensional dimensional image data. A camera embodiment has two main variations: a wide-angle camera with digital selection of a target and a narrow-angle camera with targeted control interfaces selected through direction of the camera. An alternative embodiment can include an imaging system 120 with a visual sensor with a narrow-angle field of view that is used to collect isolated visual state from a selected region. In all three design embodiments and variations, the imaging system 120 can include some variety of a visual sensor (e.g., camera, photodiode/detector, etc.) and an optical system.

In the camera embodiment, the imaging device is a camera collecting visual image data of an environment viewable in a field of view of the camera. The image data collected by the camera is preferably video but can alternatively be a set of periodic static images. The imaging data can use any suitable color space and may optionally collect additional dimensions of data such as depth, heat, and the like. The camera is preferably a visual video or still camera, but may additionally or alternatively collect infrared, depth-based, lidar, radar, sonar, and/or other types of imagery. The imaging system 120 can additionally include a low-light/night mode. For example, an IR illumination system could emit IR light and collect image data from the IR spectrum during low light or night time mode. Depth imaging devices, and other suitable forms of imaging devices may additionally or alternatively be used.

Lower resolution cameras may be usable for visually-prominent user interfaces. Higher resolution cameras may enhance interface extraction of detailed or visually "subtle" user interfaces. Different imaging systems 120 may be configured for different operating distances/distance ranges depending on the application.

Figure 4:
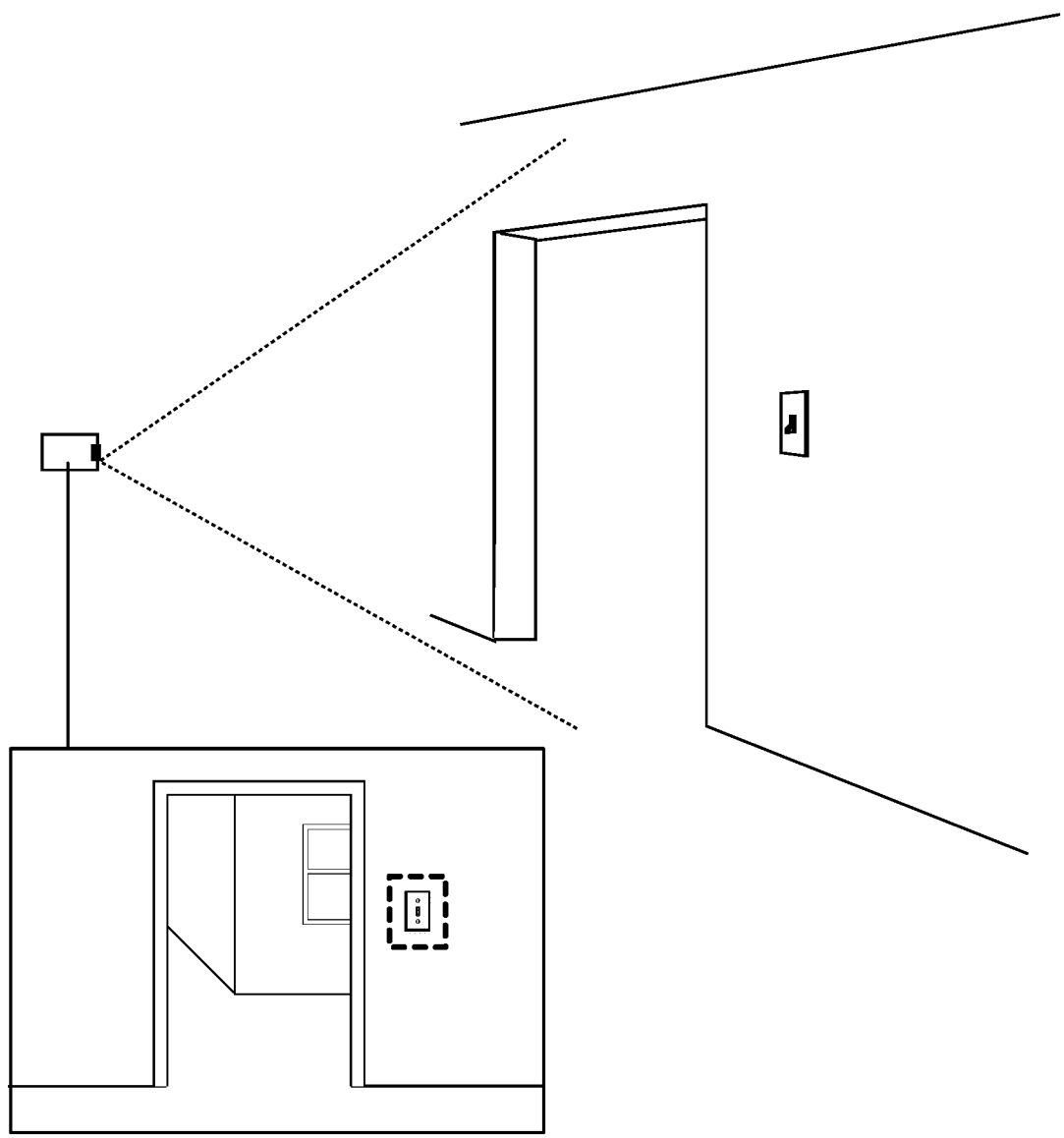
FIG. 4 is a schematic representation of a wide-angle camera variation.

In the wide-angle camera variation, the camera has an optical system that captures imaging data of the environment. The wide-angle camera variation is preferably characterized by having sufficient image resolution to select a control interface within a sub-region of the image data and for the resolution to be sufficient to interpret visual state of the control interface as shown in FIG. 4. In other words, software detection and/or selection of a controller interface may be used. Accordingly, wide-angle cameras can additionally include more traditional camera systems with "normal" field of views as well as "zoom" optical systems for long distance where the control interface is expected to only be represented by a sub-region of the image data (e.g., covering less than a 25% or more likely less than 10% of the field of view). Some exemplary wider-angle cameras may have a field of view with an angle greater than 40°, and some implementations may have field of views greater than 100°, 360° panoramic, 360° spherical, or other suitable field of views.

As the control interface is selected digitally in the image data, multiple control interfaces could be monitored simultaneously. For example, a 360° spherical camera used in a ceiling mounted lighting fixture could monitor light switches, dials, and/or other control interfaces simultaneously in controlling the light fixture or relaying control state and/or directives to other connected electronic devices. A wide-angle camera variation may utilize automatic detection of a control interface or manual/semi-automatic pairing of a control interface. A pairing process may rely on detection of pre-configured and paired control interface, detecting of a pairing identifier, manual facilitated pairing using visual markers or other suitable pairing identifier, or other suitable pairing process such as those described herein.

Figure 2A:
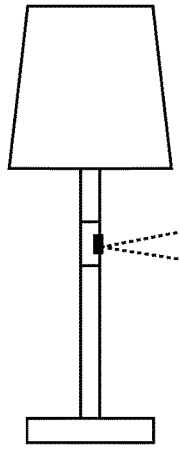
FIGS. 2A-2E are exemplary schematic representations of the system applied to various configurations of a lighting fixture'
Figure 5:
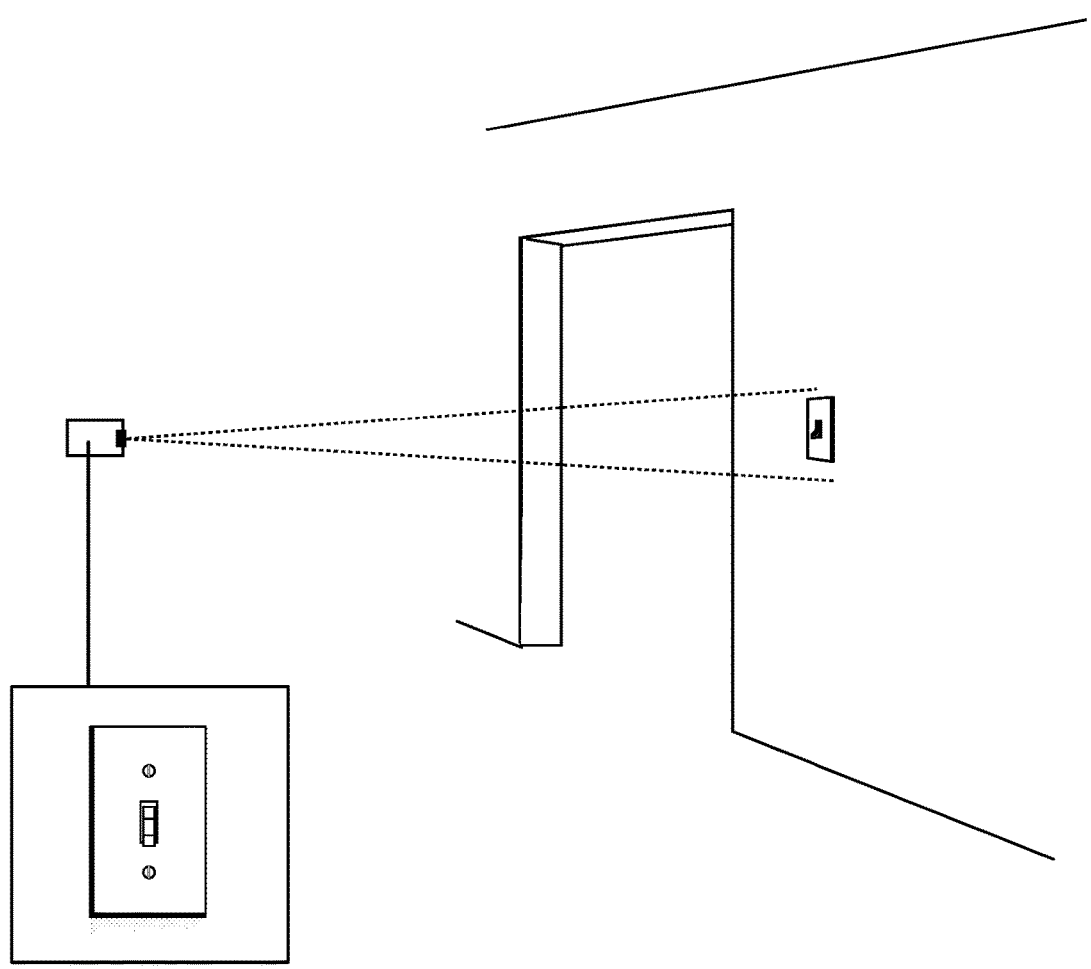
FIG. 5 is a schematic representation of a narrow-angle camera variation.

In the narrow-angle camera variation, the camera has an optical system that captures a targeted region of imaging data in the environment as shown in FIG. 5. A preferred variation of the imaging device can use a narrow-angle field of view optical system (i.e., a "zoom" lens system) that can be directed at the targeted control interface. In a narrow-angle field of view variation, the collected image data is processed as the control interface and so the imaging system 110 can be customized such that the control interface can substantially fill the field of view (e.g., covering greater than 25% or even greater than 50% of the field of view in an exemplary preferred setup). A narrow-angle camera variation may use positioning of the imaging system 110 in setting the "region" of the control interface, which may simplify the pairing process. A pairing process may still be used. The narrow-angle camera variation may be particularly applicable to low budget products and/or products that prioritize a simple setup. In one example, a tall living room lamp may have narrow-angle camera integrated into the pole of the lamp at the height of a light switch. The lamp can be "paired" with a light switch by rotating the lamp and/or the camera to point at the targeted light switch as shown in FIG. 2A.

An alternative variation of the narrow-angle camera is a virtual narrow-angle camera implementation that can use a similar imaging system as the wide-angle variation but apply the same principles of relying on direction of the imaging system to select the expected region of the control region. In this variation, the extra image data outside the region of interest may be largely discarded and only the small region of interest considered for a control interface. For example, a normal camera with a field of view of greater than 40° may be used, with the center region pre-selected as the inspected region of control interface. The imaging system must be directed at a control interface to extract a visual state of the targeted control interface. In one variation, the narrow and wide variations could be selectable options of the system where optically targeted selection and software selection are two selectable operating mode options.

The system may additionally come with a selection of optical systems so that a user could select the right optical configuration for a camera and their particular use case.

Figure 2B:
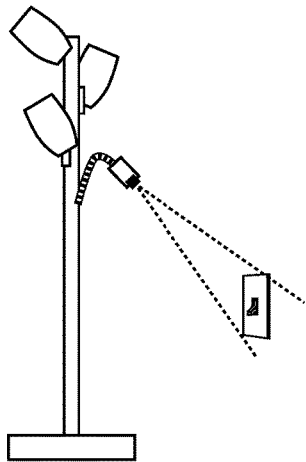
Figure 2C:
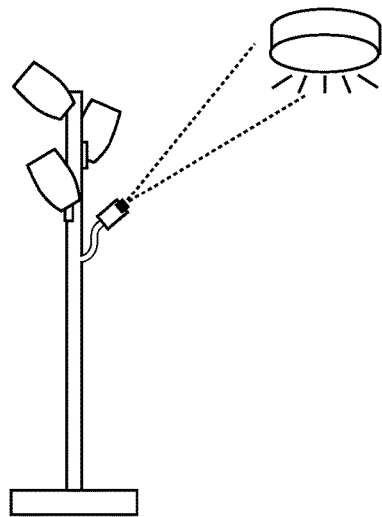

In the alternative embodiment that uses a visual sensor with a narrow-angle field of view, a non-camera sensor may be used. Preferably a basic light sensor, such as a photodiode, a low resolution camera, or any suitable light sensor. The photodiode or alternative basic light sensor embodiment may be used to collect the isolated visual state of a selected region. This embodiment preferably uses targeted selection of a controller interface by directing the imaging system. Basic visual interpretation of the region for some forms of "control interfaces" does not depend on a particular resolution and can be applied with a single point of image data. Lighting intensity, light intensity changes, color profiles, and the like may be detectable using a single point of visual sensing or a small array of visual sensors. This variation is particularly applicable to implementations that monitor light indicator interfaces. In particular, the visual sensor embodiment can be used for interpreting visual state of a region that is optically isolated to a single light source as shown in FIG. 2C. A single light source could be a single light bulb/lighting unit or a cluster of lighting units (e.g., a chandelier). For example, a photodiode with a targeted optical system can be used to track a particular lighting fixture. When the electronic device is itself a lighting fixture this can create lighting fixture that follows or mirrors a "master" lighting fixture. For example, a lamp that is plugged into a normal wall outlet could be made controllable by a light switch by positioning the imaging system on another light source controlled by a light source. This variation additionally can include a directable housing, but the positioning may be alternatively be static relative to a coupled electronic device 110. Following of a lighting fixture could similarly be achieved in camera-based variations above.

The imaging system 120 is preferably integrated into the body of the electronic device 110. The imaging system 120 is preferably positioned so that the expected field of view is selected to accommodate expected usage of a control interface. For example, on a standup lamp, the imaging system 120 may be a camera integrated into the lamp pole so that a light switch mounted at a normal height may generally be viewable under expected conditions.

In one variation, the imaging system 120 is statically mounted to the electronic device. The field of view of the imaging system 120 can be altered by repositioning the electronic device as shown in FIG. 2A.

In another variation, the imaging device is positionable. An imaging device could be manually directed or moved as shown in FIG. 2B. The system may include a directable housing that at least partially encases an imaging device and couples to the electronic device 110. The directable hosing could be a rotatable, bendable, or otherwise provide maneuverability. The directable housing can function to enable the imaging system 110 to be directed so that the field of view captures a region of interest. In one variation, an imaging device of the imaging system 120 could be mechanically, optically, or digitally actuated where the field of view can be changed by rotating, elevating, panning, zooming, moving and/or otherwise altering the field of view.

Figure 2D:
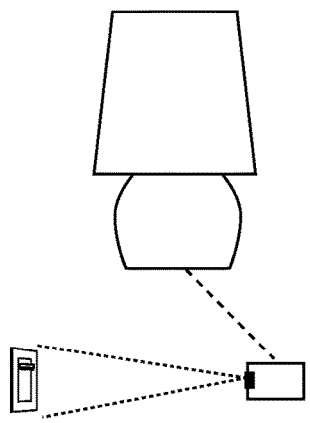
Figure 2E:
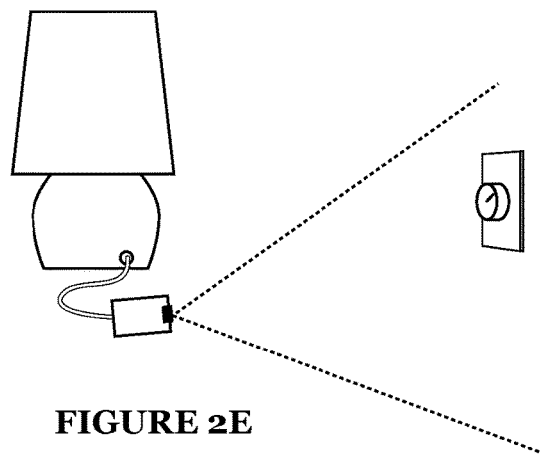

In another variation, the imaging device (and optionally the control system along with other selected computing elements) can be communicatively coupled through a wire (as shown in FIG. 2D) or wireless connection (as shown in FIG. 3E) to the electronic device. For example, a device following lamp could have a camera to wirelessly communicate control signals to the lamp. In a related variation, the imaging system 120 could be a vision system interface that enables integration with an existing imaging system (e.g., surveillance cameras).

The imaging system 120 preferably continuously or periodically collects image data that is processed by the control system 130. The imaging system 120 may alternatively be dynamically controlled to collect image data on demand to collect image data for the device interface processing engine. The capture configuration of an imaging device could be statically set but may alternatively be dynamic. Capture configuration can include any suitable imaging setting such as ISO, aperture, shutter speed, zoom, or other settings. The capture configuration could be dynamically altered based on one or more results of the control interface 120. The capture configuration could additionally operate in alternating capture configurations so as to cycle through camera settings customized for different monitored control interfaces or for different environment monitoring modes.

Herein, the system is primarily described as it would be used for visual interface extraction. The system could additionally or alternatively utilize one or more microphones to collect audio, vibration, and ultrasonic signals and convert the collected data into an extracted sound-pressure interface representation of a control interface. The system could additionally or alternatively utilize one or more chemical sensors to collect signals and convert the collected data into extracted chemical interface representations of the device. In an alternative embodiment, the system can be implemented with only visual, only microphones, or only chemical sensors, or any combination where interface cues can be collected and processed without other forms data collection.

The control system 130 of a preferred embodiment functions to transform the collected image data from the imaging system 120 so as to be used in directing some aspect of operation of the electronic device 110. The control system 130 is communicatively coupled to the imaging system 120. The control system 130 also interfaces with operational control of the electronic device 110 in some manner. In one variation, this operational control may be fully directed by the control system. In the lighting fixture implementation, the control system 130 can control the illumination state of the lighting fixture. In another variation, the control system 130 communicates or provides some form of input to another control system or processor. For example, in a relay device implementation, the interpreted visual state of the control interface can be relayed or communicated to another application, processor, or suitable component so as to be used by the relay device.

In one implementation, the control system 130 can be a computing system that includes a processor and/or other suitable computing components. The control system 130 may alternatively be part of an application operable on a multi-purpose computing device. The control system 130 preferably facilitates CV-based processing of the image data. Alternatively the control system 130 may communicate image data to a remote processor or service for interpretation. In an alternative implementation, the control system 130 could be circuit defined logic. For example, a photodiode-based imaging system as discussed above may use circuit components to facilitate interpretation of the visual state without dependence on a processor.

The control system 130 preferably includes a visually monitored interface control mode, wherein a control interface is monitored through the image data and used in directing operational state of the electronic device 110. The visually monitored interface control mode of the control system 130 preferably includes configuration to: interpret a visual state of the control interface and modulate the operating state in coordination with the visual state.

Image data is preferably collected through the imaging system 110 and then the image data can be processed. The image data can be translated to an extracted interface representation of the control interface thereby establishing visual state. Interpretation of the visual state can include detecting of a set of visual physical states of the control interface. For example, the two or more positions of a switch, the angular position of a rotatable dial, the linear position of a slider mechanism, user interaction with an interaction region, and the like. The interpretation may be executed according to extraction configuration set for the particular control interface.

As discussed herein, interface extraction as performed through interpretation of visual state may include one or more of a variety of extraction modes including: physical state extraction, indicator detection, dial extraction, switch extraction, character extraction, presence extraction, gesture extraction, and/or device model extraction. These various modes of interface extraction may be pre-configured in different systems depending on the expected use-case. For example, many electronic devices such as lighting fixtures, fans, and the like may benefit from supporting switch extraction, dial extraction, and/or indicator extraction. There may alternatively be other implementations or types of electronic devices 110 that could benefit from the other forms of interface extraction. While only a single extraction mode may be implemented in some implementations, some variations may support multiple modes so that a single system may be operable with a variety of types of control interfaces.

The configuration to interpret a visual state may include configuration to apply one of those forms of extraction on a control interface. The control interface may be detected and located within the image data. In a narrow-field of view variation, the control interface may be detected within the designated region (e.g., as designated by positioning of the imaging system). CV-based object detection of the control interface or an associated visual marker may be used in detecting the control interface. In one alternative, there may be no specific object that is the control interface. Instead, a defined region targeted by the imaging system can be a region in which various CV-detectable objects, interactions, events, or situations may be detected.

Figure 6:
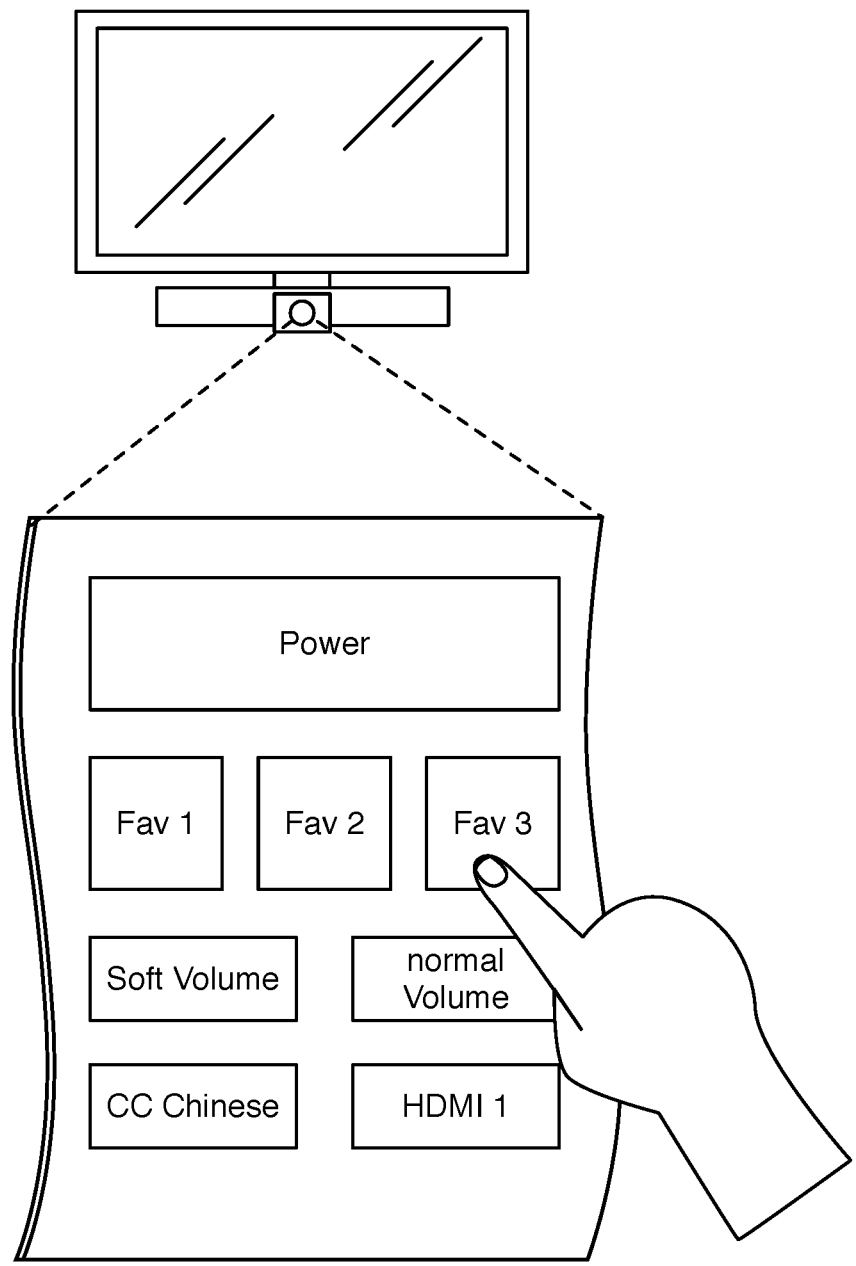
FIG. 6 is a schematic representation of interaction detection on a printed control interface.

One particular form of visual state interpretation can be gesture detection. As an example of a gesture-based variation, configuration to interpret a visual state of the control interface can include configuration to detect a visual gesture within an interaction region of the control interface. The tuple of a particular visual gesture and interaction region can be mapped or associated with an operating state input. In this variation, the control interface can include at least one interaction region, but may additionally include multiple interaction regions. Each interaction region can be associated with some visual state data and may accommodate detection of different visual gestures. Restricting gesture detection to an isolated region defined for the "control interface" can make detection of a gesture more explicit indication to alter some operational state and processing can be simplified as the gesture detection is limited to a restricted region(s). Gestures may also relate to interaction gestures between two or more objects such as a person and an object. In one example, the locking of a key may turn on a light. In another example, user touch interaction with a graphical control interface (e.g., a set of designated interaction regions printed on a piece of paper) may be detected and interpreted as some visual state indication as shown in FIG. 6.

In one particular variation, the system may accommodate interpretation of two or more control interfaces. The imaging system 120 is preferably a camera with a wide-angle field of view such that two or more control interfaces can be monitored simultaneously. For example, there could be at least two detectable control interfaces, and each may have their respective visual states interpreted. The visual states of the two or more control interfaces may be analyzed in combination to control one operating state aspect. For example, two light switches could be logically ORed to determine state. Alternatively, the two control interfaces could be assigned to control input for different aspects of the operational state. The set of control interfaces may be the same type of control interface, but there may be any suitable number of types of control interfaces. In one variation, a first type of control interface may have a first set of visual states that is mapped to at least two distinct operating states (e.g., on and off) and a second type of control interface may have a second set of visual states that are mapped to a range of operating states (e.g., illumination intensity).

The control system 130 preferably applies the visual state for making some change in the operating state. A preferred implementation can be in setting the activation state of the electronic device no or some component of the electronic device 110. Activation state for some electronic devices may include on and off states. In the lighting fixture example, the visual state can include turning on or off the illumination state in coordination with the control interface. Preferably, the illumination state mirrors that of visual state of the control interface. The operating states could include any suitable number of states, and support any suitable arbitrary logic used in translating visual state to a state transition. As another variation, modulating the operating state may include the setting of an operating parameter. In the lighting fixture example, the visual state may be used to set the illumination intensity (i.e., brightness), the lighting hue, or other suitable aspects.

The control system 130 can preferably be configured to apply various forms of logic. One potential configuration of logic can be set to modulate the operating state in synchronization with that of the control interface. Accordingly, the operating state is updated to mirror a corresponding state of the control interface. For example, a light switch may be designated with two more physical states that are mapped to on and off states respectively. The illumination state can be activated when the physical state associated with "on" is detected, and the illumination state can be deactivated when the physical state associated with "off" is detected. In another variation, the electronic device can be a first lighting fixture that targets another light as the control interface, and the first lighting fixture can mirror the lighting state of the targeted light—the first lighting fixture turns on and off with the turning on and off of the other light. As the targeted light is directly focused, the first lighting fixture is preferably not influenced by outside lighting conditions.

In variations where multiple control interfaces can be monitored, the logic could potentially be configured with logic that collectively applies the visual state. In this variation, multiple control interfaces can cooperatively specify the same control signals. For example, multiple light switches could be monitored, and anytime one of the light switches is toggled, the illumination state of a device following light fixture could change.

In variations where the imaging system 120 includes a camera imaging device, CV-based analysis of the image data may be used in addition to the CV-based interpretation of the control interface. CV-based analysis can include people detection, facial/biometric person identification, object detection, event detection, scene description, detection of interactions between people and/or objects, and/or any suitable CV-based conclusions. The logic could potentially apply CV-based context analysis in processing the visual state of a control interface. In one example, the visual states may be selectively assigned to different operating state directives based on detected person identity. The control interface may perform one action for one user and a second action for a second user.

In some variations, the control system 110 may include configured logic that can address obstructions of the control interface. In one potential approach, logic that delays and/or applies some form of state-change hysteresis to visual state changes may function to avoid accidental transitions. For example, illumination state may be changed only after the visual state has been detected for some minimal amount of time. As another potential approach, visual state may only alter operating state when a CV-based analysis of the image data detects a person or a person in proximity to the control interface. This can function to ignore visual state changes when a user is not present to make the change.

The control system 130 could additionally apply any suitable arbitrary logic. For example, the logic may consider timing, operating state history, externally sensed or collected data, and/or any suitable inputs in combination with the visual state in evaluating the logic to drive operating state.

In an embodiment where the imaging system is a camera imaging device and more specifically a camera with wide-angle field of view, the control system 130 can additionally be configured to detect a control interface in the field of view. The control system 130 may configure a sub-region of image data as a location of the control interface. The system can support auto-detection of a control interface, manual configuration of a control configuration, partially automated detection/configuration of a control variation, and/or other processes to facilitate pairing a control interface and interpreting the visual data collected by the imaging system 120. In an auto-detection variation, configuration of the sub-region can be automatic using CV-based object detection.

In manual and/or partially automated detection, a user may facilitate pairing which may include identification and locating a control interface within the image data and/or setting of extraction configuration. Pairing preferably establishes an operational link between a control interface and the system. Extraction configuration may be automatically selected based on CV-based classification or identification of the control interface. Extraction configuration may additionally or alternatively be customized. In one preferred implementation, the control system can include a pairing mode, wherein during a pairing mode, the control system 130 is configured to detect a pairing identifier in a sub-region of the image data, and upon detection of the pairing identifier, register that sub-region for detection of a control interface. A pairing identifier can be a visual marker, which may be used to detect the control interface and/or to identify execution configuration to be used. In one variation, control interfaces are provided with a pre-paired electronic device. The control interface can include some identifier so that upon detecting the pairing identifier, the control system 130 of the electronic device no automatically knows to monitor that control interface and ignore other compatible device interface sources. In another variation, the pairing identifier can be some user interaction or gesture that when detected, establishes a sub-region in the region of the interaction or gesture.

Figure 7:
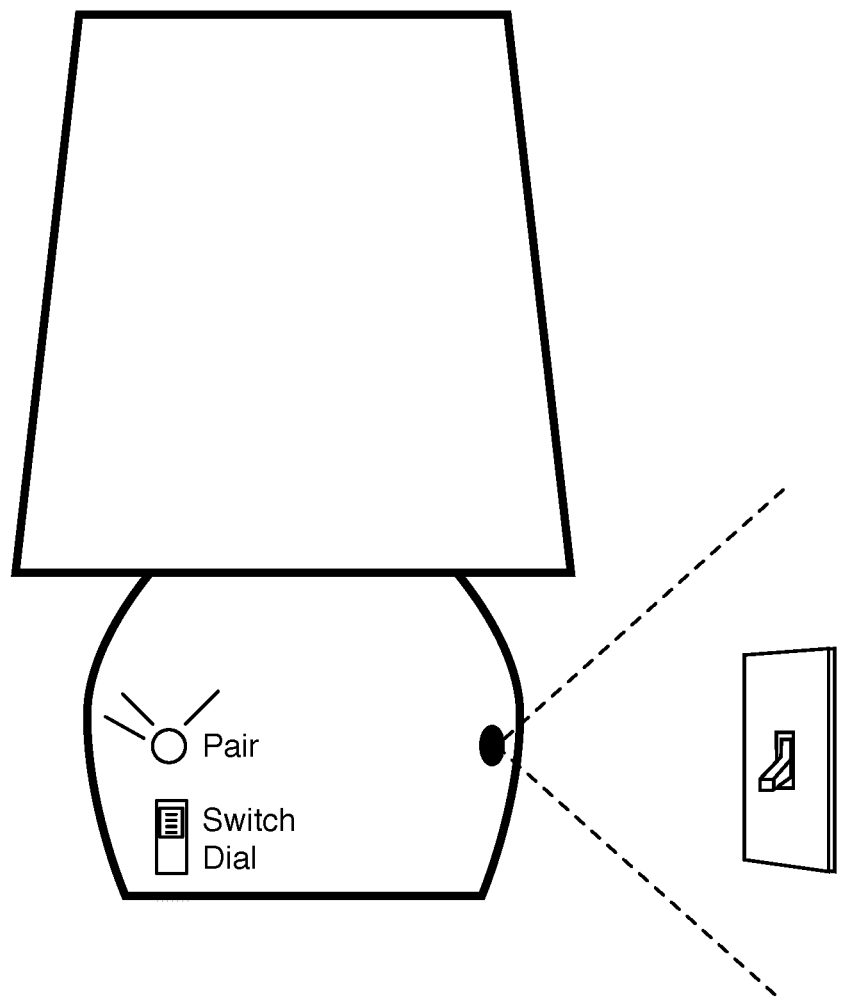
FIG. 7 is a schematic representation of an electronic device with a pairing trigger and indicator.

In the manual variation, the system may include a pairing trigger and a pairing indicator as shown in FIG. 7. The pairing trigger can be a button, switch, or some element that when activated can set the system to a pairing mode. The pairing indicator can be some user interface element to signal the pairing state of the system (e.g., in pairing mode, paired to a device, unpaired, lost pairing connection, etc.). The pairing indicator can be an LED that blinks or illuminates to signal various pairing related information. In some basic implementations, a control interface type selector can be used to pair different types of control interfaces. For example, a switch could be used to select different extraction modes as shown in FIG. 7. This can function to simplify object detection and configuration of extraction configuration. A user application that connects to the interface extraction system could additionally or alternatively be used in setting extraction configuration.

In some variations, modulation of the operating state may be restricted to modulation of the operating state during detection of the control interface, which functions minimize interface extraction and operating state management to when the control interface is viewable. Additionally, the system may include a proximity sensor, a microphone, or other suitable type of activity sensor to detect activity or user presence. Activity sensors such as these may be used to detect when users are present or there is some activity in the region. The control system 130 could be configured to activate the visually monitored interface control mode upon activation of the ambient activity sensor and optionally to enter the interface extraction system into a power saving mode otherwise.

At times, multiple control interfaces may be detected. All or a subset (e.g., one or more) may be used as a monitored control interface, while some may be ignored. For example, multiple light switches may be detected but only one may be selected to be paired with control of the operating state. In another scenario multiple control interfaces can be detected and interpreted so the combined visual states is used cooperatively in controlling operating state. For example, the control system 130 may be configured to detect a first control interface in a first sub-region of the image data and a second control interface in a second sub-region of the image data; interpret a first visual state from the first control interface and a second visual state from the second control interface; and modulate an operating state in coordination with the first and second visual states.

The system may additionally include a control interface 140. Some implementations may include the control interface 140. Alternative implementations may operate on existing or other control interfaces 140. A control interface can be a type of device or system for visually communicating control input. The control interface 140 is preferably a type of device interface source. Control interfaces 140 preferably include many common user interface elements such as light switches, buttons, dimmer sliders, dials, and the like. Common elements such as these that already exist in the environment may be used as a control interface 140. For example, a light switch when targeted may control the electrical outlets to which it is conductively connected, but can also control electronic devices to which it is coupled through interface extraction of the system.

In some variations, the control interface 140 can be a non-electric element. Such non-electric control interface may be accompanied by more flexibility as they could be positioned at desired locations without having any electrical connections. In other words, the control interface 140 may be a mechanical mechanism with two or more physical states that can be visually interpreted. In another non-electric variation, the control interface 140 has designated interaction regions, which can be marked graphically, through the control interfaces form, or in any suitable manner. Gesture interactions performed on, against, in front of, or in proximity to the interaction region can be interpreted as visual state. In one implementation this can include a control interface that is printed with one or more graphically indicated interaction regions. Highly customized control interfaces could easily and economically be created through such printing techniques as shown in FIG. 6. For example, an un-connected light switch could be stuck to a location on the wall, targeted by the system, and then used as a light switch.

The control interfaces could additionally include other alternative forms of interfaces including systems that are not traditionally thought of as user interfaces. For example, the presence of car keys in a bowl may indicate the home owner is home and so certain lights should be activated.

Control interfaces provided by the system in one variation may include a pairing identifier, and the control system 130 can be configured to detect a control interface through identification of the pairing identifier in the image data. The pairing identifier may be pre-associated with the interface extraction system so that interface extraction is restricted to only the pre-associated control interfaces.

Figure 8:
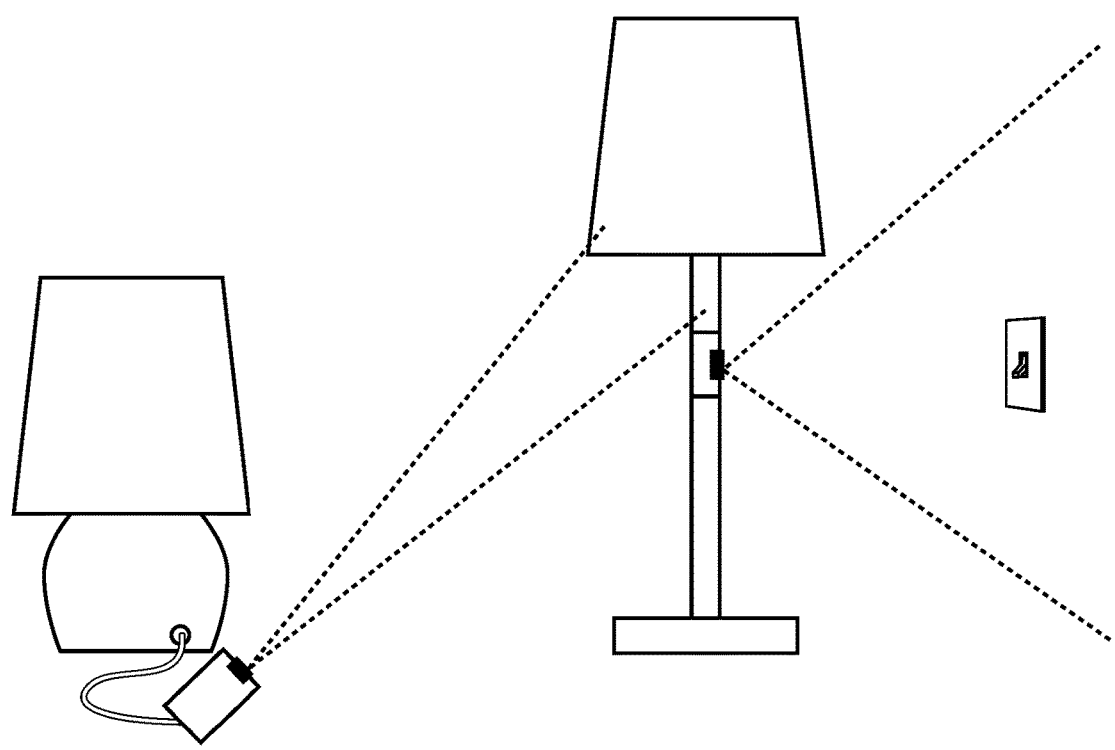
FIG. 8 is a schematic representation of the system applied to a network of electronic devices.

The system has been primarily described as it relates to integrating interface extraction into the operation of an electronic device. The system may additionally include multiple instances of such electronic devices used in combination. In some implementations, a network of interface following electronic devices can be architected. In an example shown in FIG. 8, a lighting fixture may follow a light switch, and a lamp may follow the illumination state of the lighting fixture. Additionally, electronic devices with the interface extraction system may establish network connections to other compatible electronic devices such that a network of electronic devices can establish an imaging system with greater coverage area.

4. Method

Figure 9:
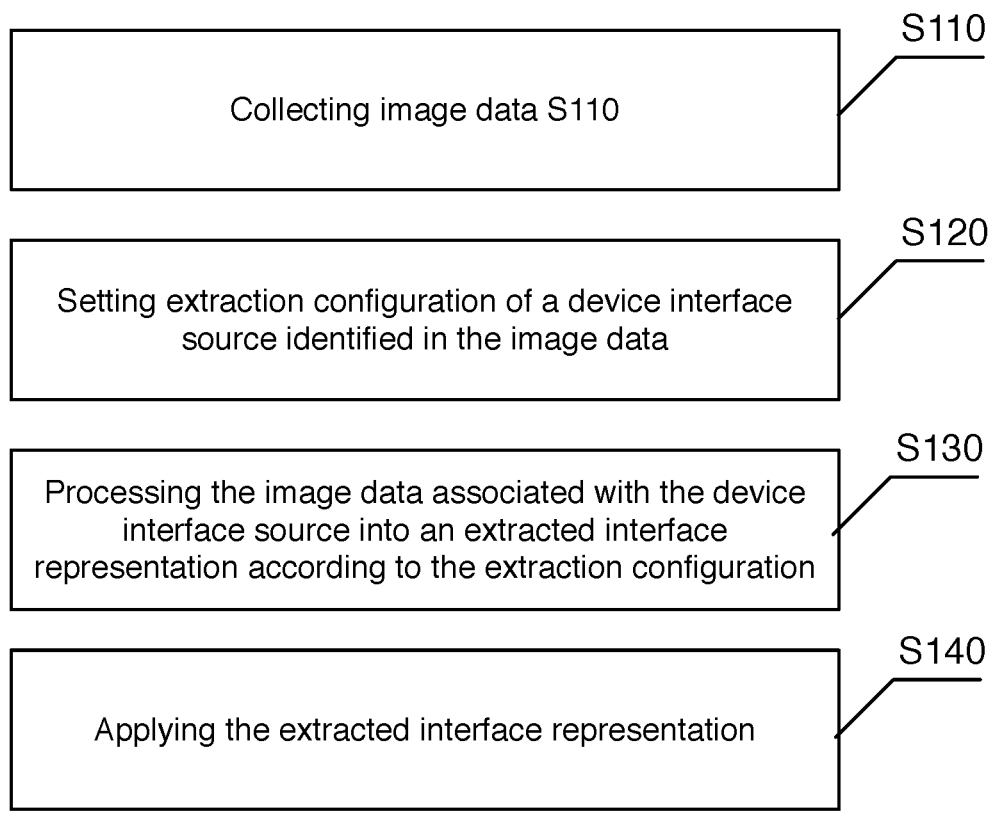
FIG. 9 is a flowchart representation of a first method.

As shown in FIG. 9, a method for establishing, uncoupled, remote integration with a device through a user interface output of a preferred embodiment can include collecting image data S110, setting extraction configuration of a device interface source identified in the image data S120, processing the image data associated with the device interface source into an extracted interface representation according to the extraction configuration S130, and applying the extracted interface representation S140. The extracted interface representation is some measurement or descriptive property of visual state, and can be used within an electronic device in augmenting, controlling, or directing the operating state. The method can be performed by a system as described above, but any suitable system may alternatively perform the method.

The method functions to enable a user to setup an interface extraction system of an electronic device and adapt the interface extraction system for a particular use case where one or more device interface sources undergo user interface translation. Preferably, the method performs visual interface translation where graphically apparent information concerning the subject (i.e., the device interface source) The method is preferably implemented in connection with an interface extraction system, which may include a camera to monitor a device. Various techniques for pairing, use of a user application, or other approaches may be used to configure m configure and/or interface with the output of the method. The method is preferably operable on a wide variety of types of extractions including digital and analog interfaces.

The method here is described primarily from the perspective of visual interface translation of a single device interface source. However, the method can additionally be used for extraction of multiple device interface sources from image data from a single camera, coordinating extraction across multiple imaging devices, performing multiple modes of extraction for a single device interface sources, and/or other variations.

As used herein, a device interface source is an object observable through image data that has some properties or output representing some information. A device interface source can be an analog device such as a switch, a dial, an analog thermometer, a digital device such as a digital thermometer, a stateful computing device, or other suitable objects that convey some information through their state. A device interface source can additionally include an object or objects that traditionally are not thought of as a user interface but represent information. For example, the presence of a coat on a coat rack may be indicative of presence of a user and weather conditions and could feasibly be converted as a data feed through the system and method. A device interface source can be usable as a control interface for an electronic device.

Block S110, which includes collecting image data, functions to collect video, pictures, or other imagery of a region potentially containing one or more devices. In one variation, the image data may be directly collected from an imaging device (e.g., a camera) controlled by the interface extraction system. In another variation, the imaging data is collected as a data stream or data file. For example, video may be collected from an existing security system and communicated to the interface extraction system.

Collecting image data preferably includes collecting video data. Collecting image data could alternatively include collecting periodic images or collecting any suitable type of image data. The image data can include high resolution video, low resolution video, photographs from distinct points in time, image data from a fixed point of view, image data from an actuating camera, visual spectrum image data, infrared image data, 3D depth sensing image data, parallax, lidar, radar, sonar, passive illumination, active illumination, and/or any suitable type of image data.

Figure 10:
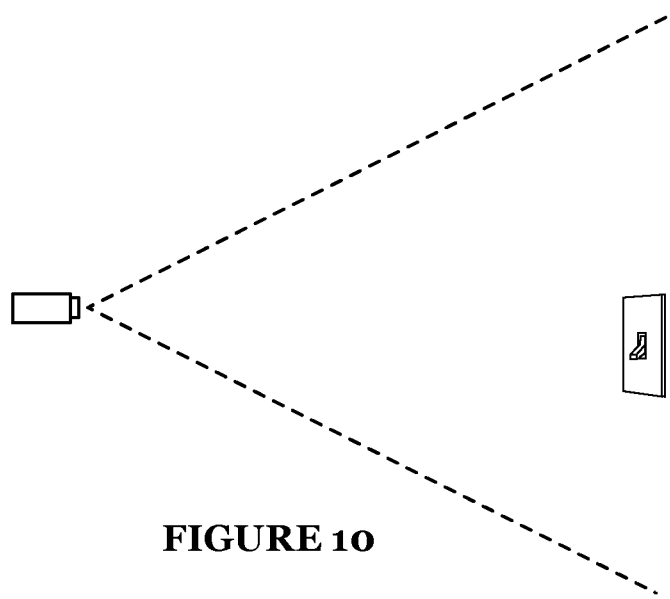
FIGS. 10 and 11 are schematic representations of different types of imaging device configurations.
Figure 11:
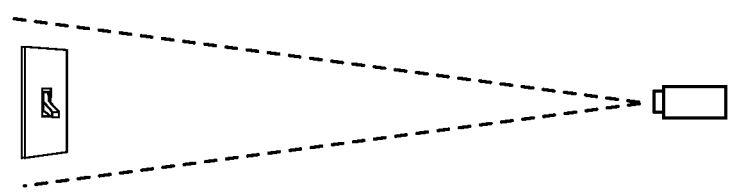

There is preferably at least one imaging device collecting image data. The imaging device is preferably a camera either a video or still camera. The imaging device may collect visual data only, but may additionally collect audio, spatial image data, infrared image data, and/or other forms of imaging data. The imaging device in one variation includes an optical system with a wide angle field of view, wherein generally a given device interface source will be in a sub-region that does not fill over fifty percent of the field of view as shown in FIG. 10. In a wide-angle imaging device variation, locating of the device interface source may be a process performed when setting extraction configuration in block S120. The imaging device in a second variation includes an optical system with a targeted field of view, wherein generally a given device interface source will fill a significant portion of the field of view (e.g., greater than twenty-five percent of the field of view) as shown in FIG. 11. In a targeted imaging device variation, a device interface source may be specified by simply being present or centered in the field of view.

The imaging device may be a stationary imaging device, where the imaging device preferably has a substantially stationary field of view. The imaging device in a stationary variation is preferably positioned to observe an area containing or potentially containing a device of interest. For example, a user mounts or positions an electronic device with a camera at a region to be monitored. In some cases, the device interface source and the scene are substantially stationary. In another variation, the scene is stationary. In another variation, the relative position of the imaging device and the device interface source are substantially stationary. For example, the camera and device interface source may be mounted on a moving vehicle, but the relative position remains substantially stationary. In some variations, the imaging device may additionally be actuated so as to move or be reoriented in different directions. For example, a mounted camera that rotates back and forth. In this variation, actuation position and changes in orientation/position can be accounted for in understanding the position of the device interface source.

Figure 12:
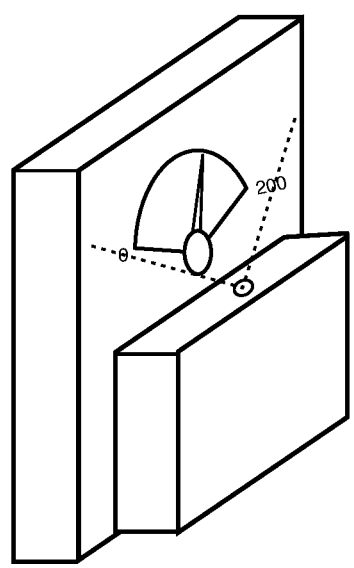
FIG. 12 is a schematic representation of a variation where the imaging device is directly coupled to the device interface source.

A stationary imaging device can be a mounted at a removed/displaced observation point. This can include mounting the imaging device to a spatially removed location from one or more device interface sources as shown in FIGS. 10 and 11. For example, a camera mounted on a wall opposite an oven could track the dials of the oven. In another variation, the imaging device may be an imaging device directly coupled to or positioned substantially near a device as shown in FIG. 12. For example, the imaging device may include a fixturing system to mount the imaging device alongside the visual interface to be extracted. In some variations, the mounted imaging device may wirelessly communicate extracted interface representation and/or operating state to the electronic device. A custom optical system may be used optically account for a non-direct viewing angle. An optical system can facilitate correcting for orientation misalignment of the camera imaging plane and a subject plane, which can mitigate distortion and/or improve focus for regions of interest along a plane of a user interface. A Scheimpflug (e.g., tilt shift) optical system can create a wedge shaped depth of field that can be aligned with the subject plane (e.g., the plane of a user interface display). A directly mounted imaging device may be particularly applicable for high reliability applications. For example, a directly mounted imaging device may cover the face of a gas meter or pressure valve. In such an implementation, the system may include an output display such that collected data can be mirrored on a display (as a data representation and/or a image representation), which can be helpful if the imaging device obstructs the view of the actual output In another example, the screen of a medical monitoring device may have an imaging device mounted along one border with a corrective optical system as described above.

The above imaging device may additionally be used in an imaging device network that collects image data from multiple imaging devices integrated into controllable electronic devices or other systems. Preferably, collecting image data occurs from a variety of capture points wherein collecting image data includes collecting image data from multiple image capture devices (e.g., cameras) distributed at distinct points in an environment. The set of capture points can include overlapping and/or non-overlapping views of monitored regions in an environment. The set of capture points can additionally establish a high density imaging system within the environment. The image data can substantially covers a continuous region. However, the collected image data may alternatively constitute non-continuous regions with holes, gaps, uninspected regions, and/or noncontiguous regions. The imaging device network may be used for monitoring distinct regions and distinct devices. The imaging devices may alternatively have overlapping fields of view and, in some cases, monitor the same device. Redundant observation of a device interface can be used to provide enhanced reliability in visual interface extraction, where one imaging device can provide visual observation of a device interface source when another imaging device is blocked. An imaging device network may additionally be used in tracking a device interface source through an environment while periodically or continuously performing visual interface extraction.

The method may additionally be modified to work with auditory interface elements wherein collecting image data may include collecting audio-visual data. Alternatively, collection of audio may be performed separately from the imaging devices. A device may generate distinct sounds to signal different information. These sounds may be characterized by different tone patterns. Auditory data could be collected through a microphone. The auditory sounds can be processed to convert the auditory sounds into an extracted interface representation. For example, a device may emit a particular alarm sound when a sensed metric satisfies some condition, that particular alarm sound could be detected, and a data object could be updated with a property indicating the detected condition.

Block S120, which includes setting extraction configuration of a device interface source identified in the image data, functions to setup a device, interface output, or other contextually-loaded region or object for monitoring. The extraction configuration preferably specifies regions of interest in the image data and how the image data is to be converted into a parameterized data format representing information conveyed through the device interface source.

The method may enable automatic setting of the extraction configuration of a device interface source. For example, one or more types of device interface sources may be objects that can be automatically detected through computer vision techniques of object detection/classification and then enrolled for extraction. In an instance of automatically setting extraction configuration, the method can include detecting a type of device interface source in the image data through object recognition, and automatically setting the extraction configuration of the detected device interface source according to the type of device interface source.

Figure 13:
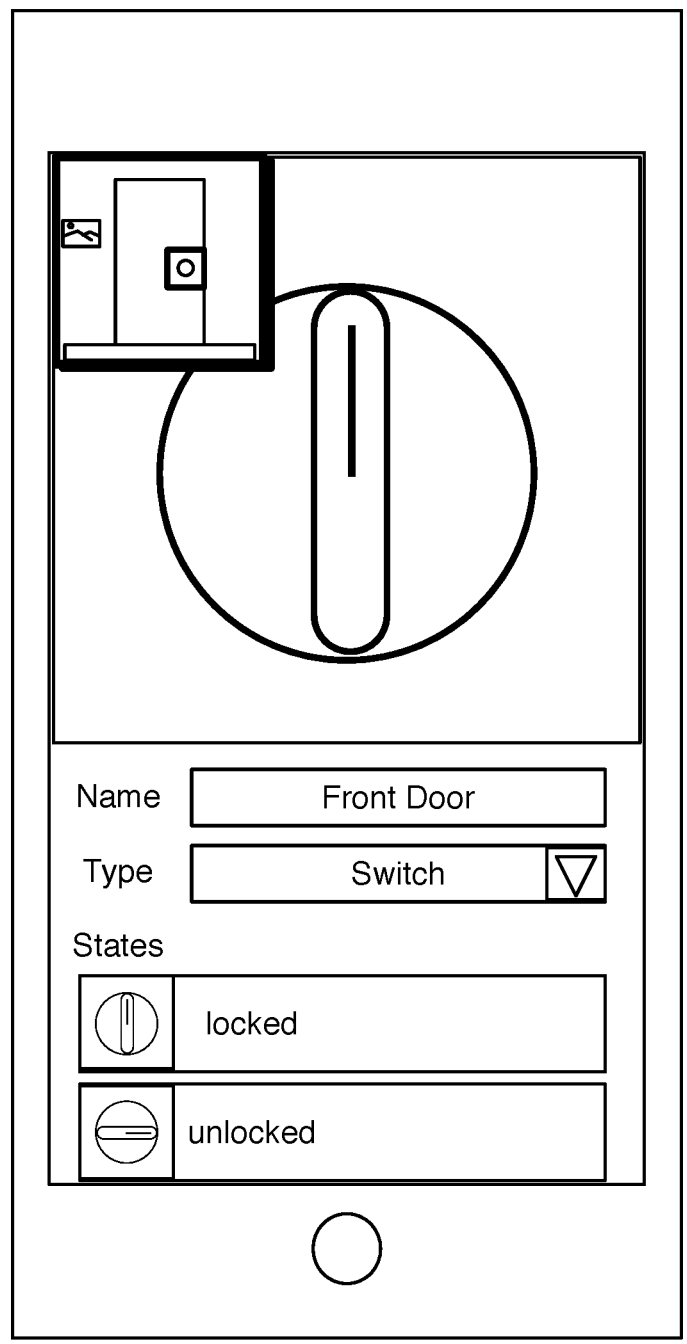
FIG. 13 is an exemplary schematic representation of a customization user interface.

Alternatively, parts of the configuration process may be performed or augmented through user input. In one implementation, a user can use a user interface to configure extraction of the device interface source as shown in FIG. 13. In an instance involving manual setting of extraction configuration, the method can include receiving manual configuration input through a coupled management application. The user interface may display an image from the imaging device and "add" a device for extraction by specifying a position of a device and providing information on how the interface should be interpreted. In yet another variation, augmentation to the device interface source can enhance monitoring of a device interface source.

The setting of extraction configuration may be performed alongside image data collection. For example, actual image data can be used in locating the region of the device interface source. The extraction configuration may alternatively be set independent of image data collection. In one variation, a user interface or configuration file/script may be used in setting the properties of an extraction configuration independent of or without real-time use of image data.

Figure 14:
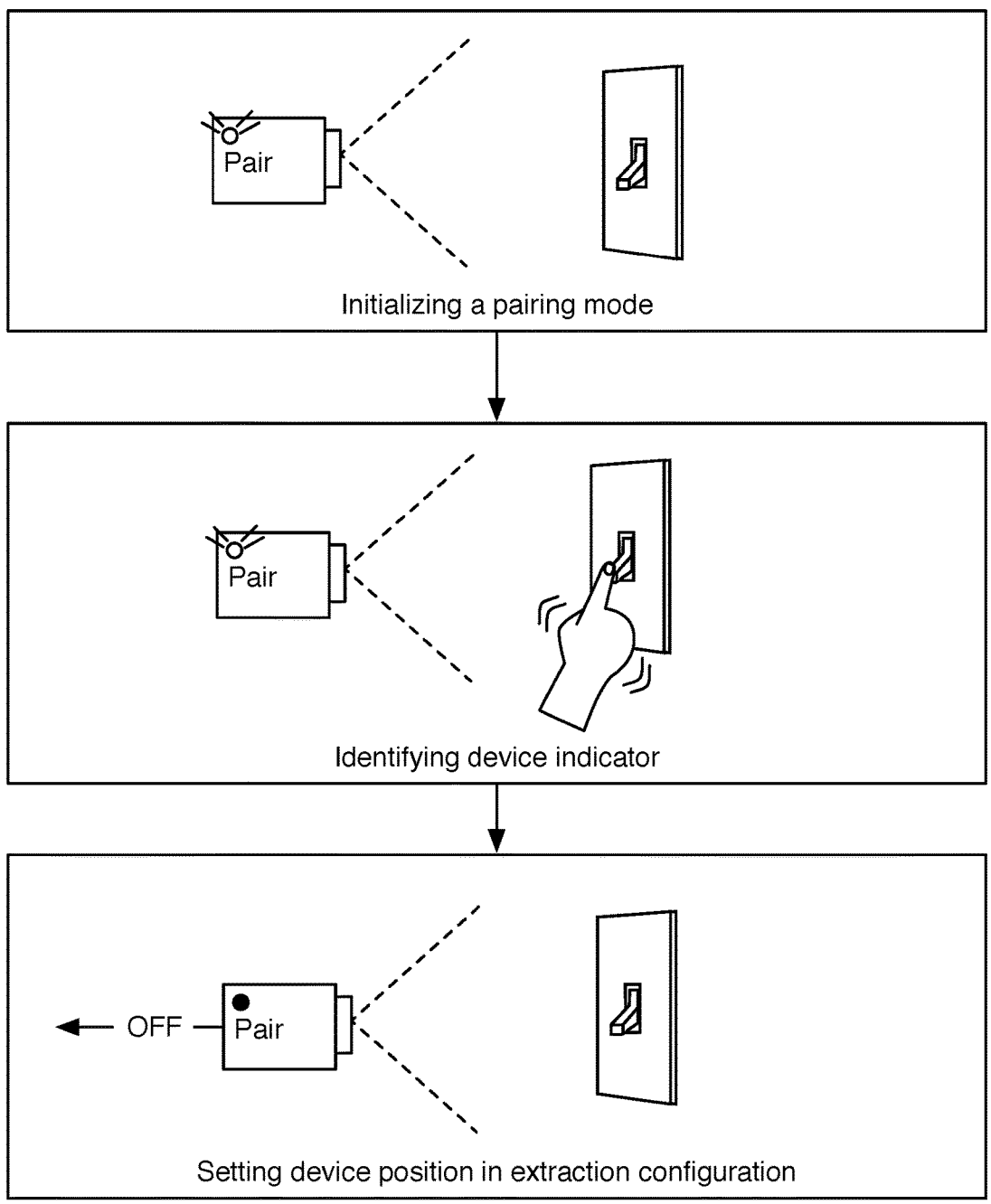
FIG. 14 is a schematic representation of an exemplary pairing process.

In yet another variation, the configuration may be set through a guided process during a pairing mode of the system. In a guided process, method may include initializing a pairing mode, identifying a device indicator in the image data during the pairing mode, and associating a device position property of the extraction configuration to a region indicated by the device indicator as shown in FIG. 14. The interface extraction system can preferably be set or requested to enter the pairing mode by a user, and during the pairing mode the system preferably operates to facilitate the setting of extraction configuration. Two preferred variations of identifying of a device indicator can include detecting a user gesture and detecting a visual marker (e.g., a QR code). Other forms of marking a region could alternatively be used.

In the variation of detecting a user gesture as a device indicator, a user may perform some detectable gesture that is detectable through computer vision. Gestures could be static gestures (e.g., thumbs up) or action gestures (e.g., swiping to the left). The user preferably performs that gesture in proximity or against the device interface source. For example, a user may be direct to place their hand, palm open in front of the device interface source of interest and count down using their fingers. The interface extraction system can produce signaling beeps for each count and then confirmation beep when that region is configured for interface extraction. Any suitable framework for gestures may be used.

In the variation of detecting a visual marker, a visual marker may be used to indicate a candidate device interface source. The visual marker could be statically fixed to the device interface source. Alternatively, the visual marker could be a card or some object that a user temporarily positions next to the device interface source. As described below, visual markers can additionally or alternatively be used in various approaches to configuration.

In one variation the initializing of a pairing mode may additionally include setting the pairing mode for a particular type of extraction, which in some variations may simplify the configuration process to identifying the region/location of the device interface source. For example, a user could turn on a dial pairing mode on an interface extraction system, then perform some action to mark the device interface source of interest, and then that device interface source can be configured for extraction as a dial.

In some instances, the interface extraction system may come pre-configured for extraction of one or more device interface sources, in which case the method may not necessitate explicit setting of extraction configuration. As one exemplary use-case, a product using an interface extraction system may be pre-configured during production to recognize and respond to one or more user interfaces. For example, a lamp may come with an imaging device to alter illumination state in coordination with a paired light switch visible in the field of view.

Figure 15:
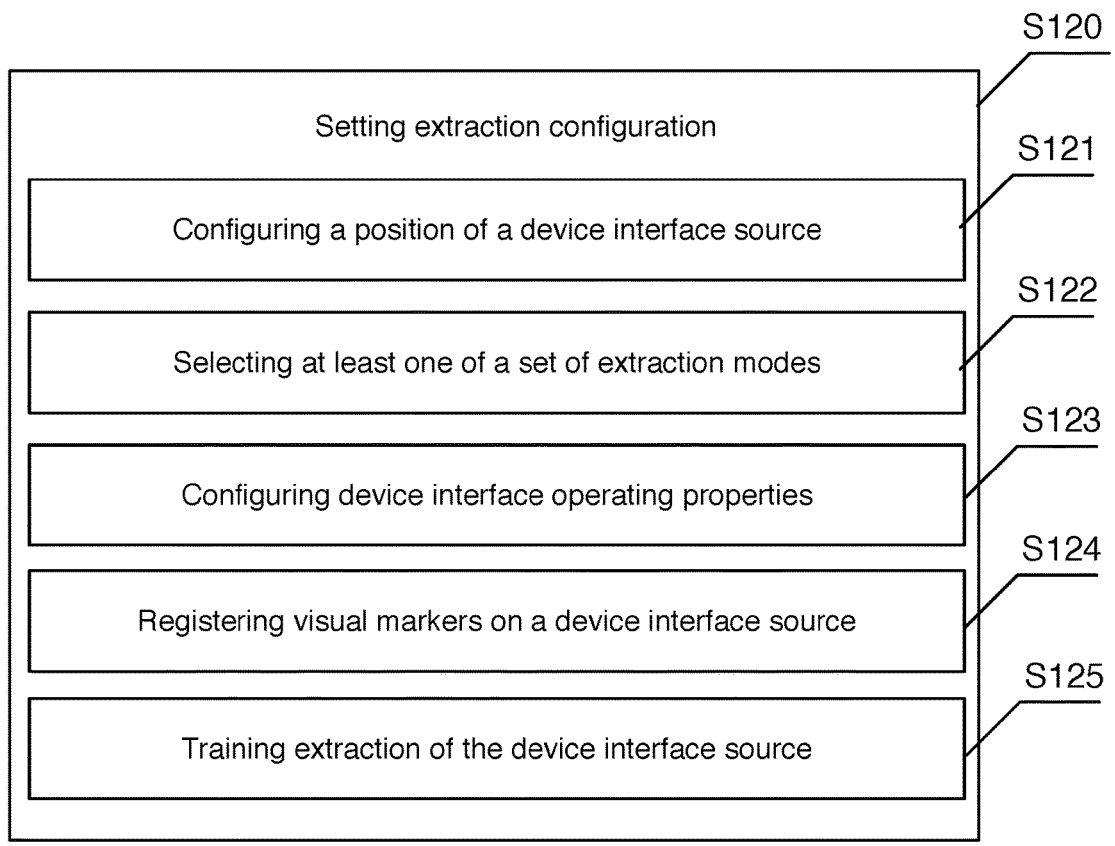
FIG. 15 is a detailed flowchart representation of configuring a device interface source.

As shown in FIG. 15, configuring a device interface source can include configuring a position of a device interface source S121, selecting at least one of a set of extraction modes S122, and/or configuring device interface operating properties S123. Configuring a device interface source may additionally include registering visual markers on a device interface source S124, and, in some variations, configuring a device interface source may additionally include training extraction of the device interface source S125. Depending on the application, any suitable combination of the processes S121, S122, S123, S124, and/or S125 may be used Block S121, which includes configuring a position of a device interface source, functions to indicate one or more locations in the image data associated with the device interface source. Configuring position can set a location and region of image data. Additionally, configuring position can include setting orientation of the device interface source.

Two potential approaches to configuring a position of a device interface source S121 can include detecting a device interface source in the image data and/or receiving selection of a position.

Detecting a device interface source in the image data functions to use computer vision to recognize a type of device interface source. Detection of a device interface source will preferably additionally identify a position and region in the image data. In some variations, detecting a device interface may additionally be used in accessing preconfigured default extraction configuration for that type of device interface source. For example, detecting a light switch can automatically result in having basic extraction configuration enabled for that light switch. In a related variation, visual marker may be automatically detected using computer vision and used in setting position and possibly other extraction configuration properties.

Various techniques may be employed in object detection and classification of a device interface source such as a "bag of features" approach, convolutional neural networks (CNN), statistical machine learning, or other suitable approaches. Neural networks or CNNS such as Fast regional-CNN (r-CNN), Faster R-CNN, Mask R-CNN, and/or other neural network variations and implementations can be executed as computer vision driven object classification processes. Image feature extraction and classification is an additional or alternative approach, which may use processes like visual words, constellation of feature classification, and bag-of-words classification processes. These and other classification techniques can include use of scale-invariant feature transform (SIFT), speeded up robust features (SURF), various feature extraction techniques, cascade classifiers, Naive-Bayes, support vector machines, and/or other suitable techniques. Object classification and detection models can be trained on particular types of device interface sources.

Receiving selection of a position functions to have the region set through user input or other forms of input. The selection of the position in one variation can involve user input indicating a position and/or region to associate with a device interface source.

In one variation, selection of the position of the device interface source can be received through a graphical user interface. A user application could display the image data and provide a user interface tool for selection of one or more regions of a device interface source. Such position specification may alternatively be specified programmatically through an application programming interface (API) or other suitable type of interface.

In another variation, selection of the position can be achieved through some interaction during a pairing mode. The pairing mode can be a special mode that when engaged, device interface sources can be identified, located, enrolled, and at least partially configured. Various forms of interactions may be supported for pairing such as a user interaction variation and a visual marker variation.

As another variation for targeted, narrow-field of view imaging systems, the position may be inherit in the direction of the imaging device as the device interface source is expected in a designated region of the image data.

In a user interaction variation, a pairing mode can include initiating the paring mode in the interface extraction system (e.g., the imaging device); detecting a user interaction in a region of the image data; and setting the position of the device interface source relative to the region of the user interaction. For example, during a pairing mode, a user could toggle a light switch multiple times to select the region of the light switch as a device interface source. The interaction could additionally be used in training or specifying other properties. In the light switch example, toggling the light switch can indicate the different states of the light switch.

In a visual marker variation, a pairing mode can include initiating the paring mode in the interface extraction system (e.g., the imaging device); identifying a visual marker and region of the visual marker in the image data; and setting the position of a device interface source relative to the visual marker. The visual marker may explicitly set the bounds of an inspected region for a device interface source. The visual marker may alternatively be used as user selection of one of a set of possible device interface sources. For example, the visual marker may be placed somewhere in the field of view, and then object detection of viable device using computer vision techniques can be used.

In the variation where the imaging device is movable, configuring position of the device can additionally include setting image collection position, which functions to detect the location and/or orientation of the imaging device when viewing the device interface source. The image collection position may additionally use distance estimation and scene analysis to understand the positioning of the device interface source, which can be used in detecting what image data collected from other perspectives could be candidates for observing the device interface source. The image collection position can include a global location, a local position (e.g., relative to a particular environment), structural position (e.g., room or location in a building or facility), and/or other forms location information. Orientation, direction, and/or information pertaining to the field of view of the imaging device may additionally be included in the image collection position information. A movable camera will preferably have a location service (e.g., GPS, Wi-Fi positioning service, etc.) and/or an inertial measurement unit (e.g., three-axis accelerometer, three-axis gyroscope, and magnetometer) where location and orientation data can be stored as the image collection position. The movable camera variations may be applied so that an electronic device could remember control interface configuration and dynamically pair with previously paired control interfaces even as the electronic device is moved.

Selecting at least one of a set of extraction modes S122 can be used when the method supports a plurality of types of extractions. The type of extraction can be set to customize the visual interface translation for the particular device interface source. The set of extraction modes can include physical state detection mode, an indicator detection mode, a dial extraction mode, a switch extraction mode, a character extraction mode, a presence extraction mode, a gesture extraction mode a device model extraction mode, and/or other suitable modes of extraction. In some cases, the extraction mode is fixed and selection is not performed.

The different extraction modes may have more granular types of extractions. For example, the physical state detection mode represents one class of extraction modes that can include the indicator detection mode and the dial extraction mode. In the case of a device model extraction mode, a particular device model is preferably specified since a device model extraction mode is generally customized to a particular type of stateful device. The different extraction modes will preferably define different operating parameters in block S123 and may offer configuration options specific to the particular extraction mode. The different extraction modes will additionally trigger correspondingly different processing routines in block S130.

Each position of a device interface source is preferably mapped to at least one type of extraction. In some variations, a single device interface source may have multiple types of extractions configured. In one variation, selection of an extraction mode is specified by received user input indicating one or more types of extraction. In another variation, the method may use computer vision based object detection, visual marker detection, or other classification approaches to automatically set the extraction mode.

In some cases, multiple types of extraction may be set for an overlapping region of the image data. Some devices may communicate information through a variety of mechanisms, and the method can isolate this information through different types of extractions. For example, a display may display a three-digit number and indicate another property by illuminating the display in one of three different colors—character extraction and color-based physical state extraction can be used simultaneously on that one device.

Block S123, which includes configuring device interface operating properties, functions to set or define parameters that characterize the way a device interface source changes and should be interpreted. The different types of extraction preferably have different sets of operating properties that characterize the components, mechanics, and models for how a particular type of device interface source operates.

Different sets of operating properties may be applicable for physical state extraction, indicator detection, dial extraction, character extraction, presence extraction, device model extraction, and/or any other types or sub-classes of interface extraction. Some varieties may have a small set of operating properties such as setting the value range and metrics of signal dial. Other varieties may have complex operating properties such as device model extraction, which may include multiple state-machines and multiple child device interface source extractions as part of the operating property for one computing device.

Configuring of operating properties can be manually configured, pre-configured to default values, and/or have automatic configuration. Automatic configuration may use computer vision in interpreting and setting one or more operating properties. In the example, of the dial gauge above, the range of values indicated by the dial could be detected through optical character recognition, automatically setting the value range. When being set through at least partial user configuration, the visual rendering of the image data can be augmented with a rendering that visually represents how the device interface source will be monitored. For example, during setting of operating properties, a substantially real-time extracted interface representation can be generated from image data.

Different implementations may expose different levels of operating properties. Advanced properties may expose configuration of low-level interface modeling properties. Higher-level generalized configuration can provide generalized operating properties for common classes of device interface sources. Such generalized operating properties may involve selection of a class of device interface source and then setting of a small set of basic properties. For example, a dial input may be selected for an oven where the temperature range are configurable properties so that based on the angle a set temperature can be extracted. The method may additionally expose a programmatic layer to enable third parties to build out custom logic for a device interface source wherein the operating properties may be defined in a configuration file(s) or application.

As described below, the processing of the image data to generate an extracted interface representation may involve multiple processing stages of formatting, recognition, classification, analysis, and/or integration. Operating properties may be configurable for each of these stages or one of these stages. In some variations, operating properties are not configurable by a user and are pre-configured or automatically set.

As examples of basic operating properties that may apply to many types of extraction, setting operating properties can include aspects such as setting units and setting a valid data values, which functions to set the labeling and formatting of the data. Units can be used to label or indicate the meaning of the data. Valid data values can set the space of values expected. This can include setting number value ranges, expected numeral/character output space, value formatting, and/or other properties of valid or likely output from the device interface source. In some cases, the method can support setting of expected operating state to bias the detection to normal operating conditions or conversely make more sensitive to certain conditions. Additionally, the temporal properties of detection and processing such as sampling frequency may be set. Other basic operating properties can include setting different actions or ways of treating. Processing and analysis logic may additionally be configurable such that customized logic can be applied on basic parameterized interface representations. Different types of extractions may use different operating properties for defining the mechanics of a particular device.

Configuring operating properties for a form of physical state extraction can be used to set the sensed properties of one or more objects in a particular region. Physical state extraction can include many various forms of state extraction including detecting general physical state properties, indicator detection, forms of dial extraction, forms of switch or mechanism extraction, presence extraction, and others.

Figure 16:
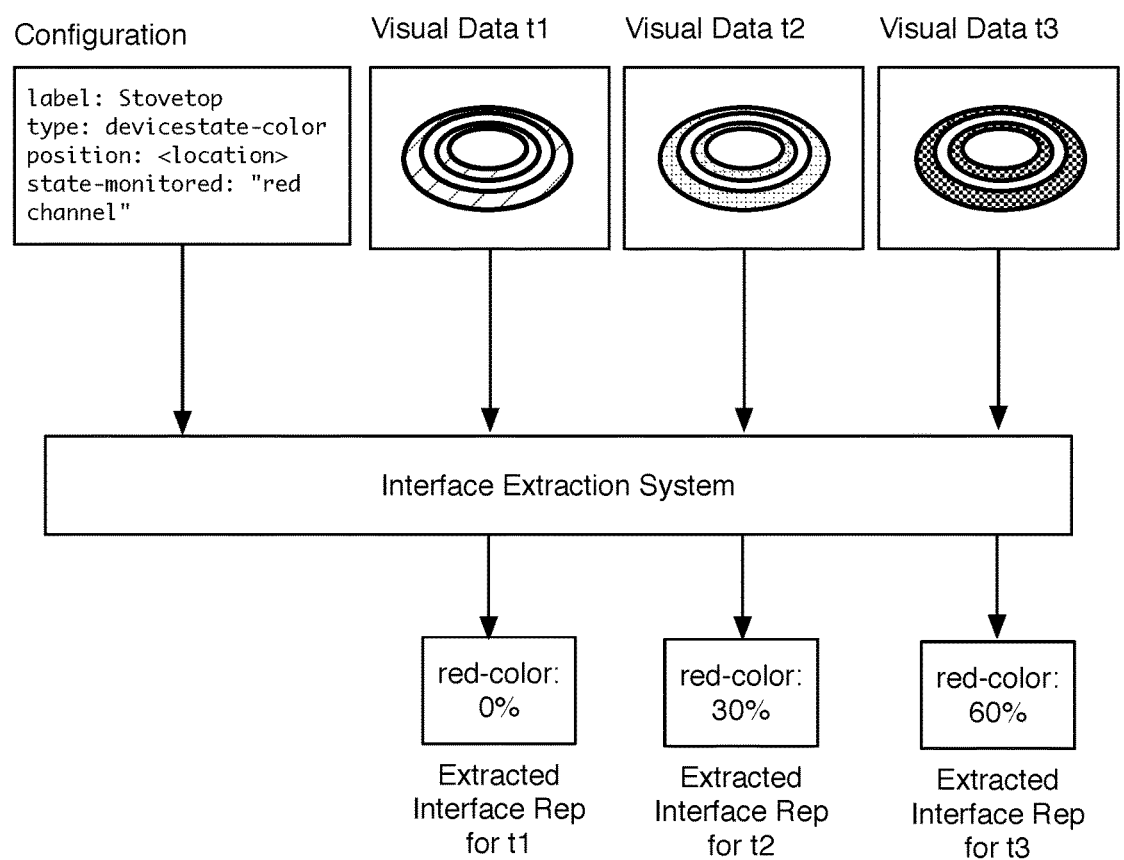
FIG. 16 is a graphical representation of the method applied to physical state extraction.

General physical state properties may include setting operating properties that characterize one or more physical attributes of the visual appearance of an object or objects can be monitored in association with a device interface source such as color, size, shape, dimensions, area, volume, appearance, or other properties. As shown in FIG. 16, a user may configure a stove top to be monitored based on the color of the burners. Note that the color range may extend into the infrared in order to better capture color data that can effectively be converted into temperature. Infrared imaging devices can be used for monitoring object temperature, melting of solid, evaporation of a liquid, leaking of a pressurized gas or liquid, paint drying determination, moisture, and/or other aspects.

Figure 17:
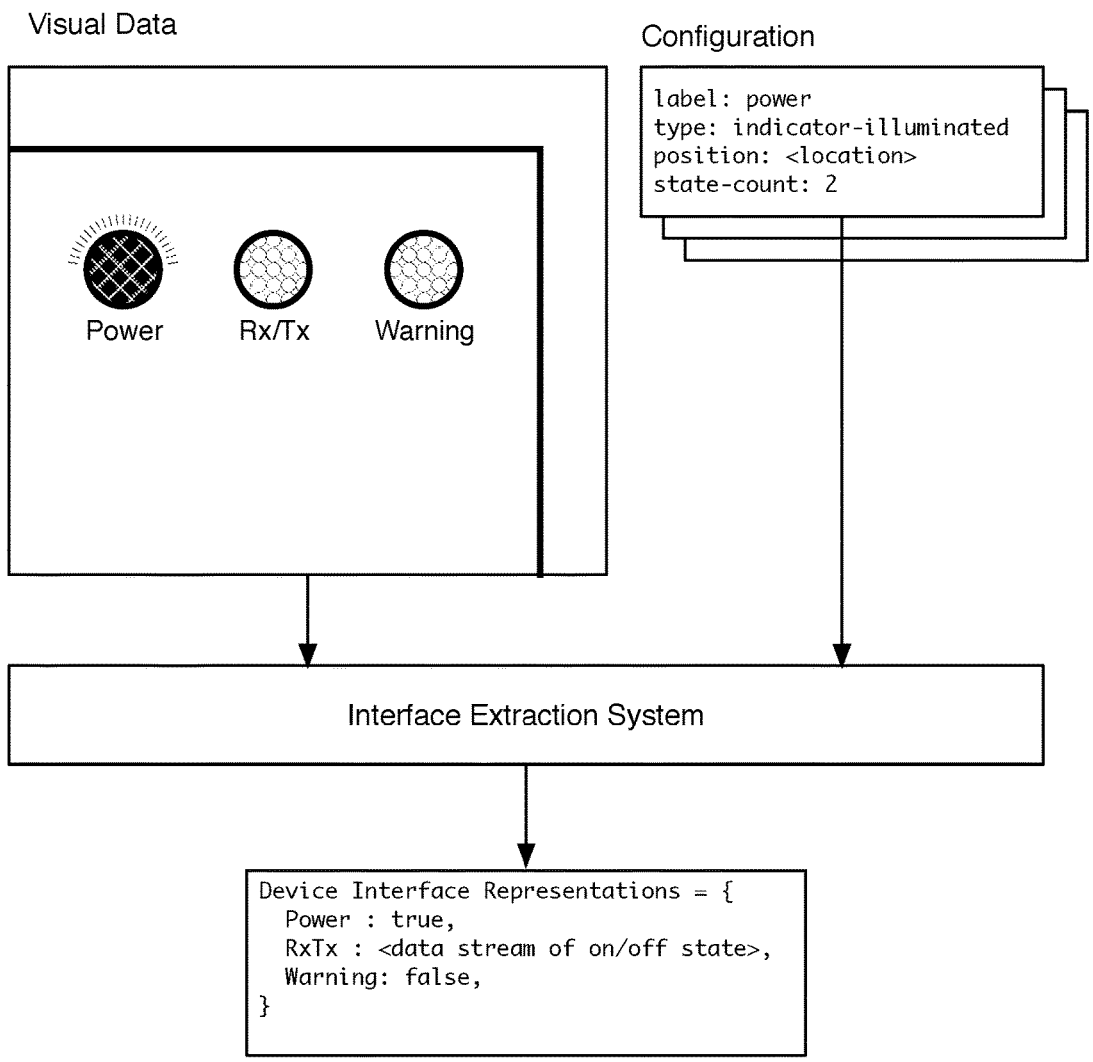
FIGS. 17 and 18 are graphical representations of the method applied to indicator detection.
Figure 18:
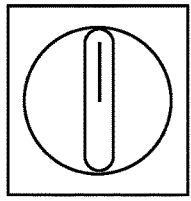

As shown in FIG. 17, configuring operating properties for indicator detection can include specifying the number of indicated states and classifying at least a subset of the indicated states. The type of indicator could be another property such as illuminated indicator, color indicator, position indicator, shape indicator, and the like. For example, a user may note that an LED indicator light has two states and that the current state is "off". Image data can be collected and associated with the "off" state. In one variation, image data may be stored and used for visual comparison. Alternatively, a set of image processing routines may be performed to characterize the state algorithmically. The user may note that the other state is "on". The user may optionally activate the LED indicator light so that image data can be collected on that state. Similarly, an analog indicator such as a light switch or a lock knob could be configured with multiple positional states being configured as shown in FIG. 18. Any number of states can be configured for an indicator.

Figure 19:
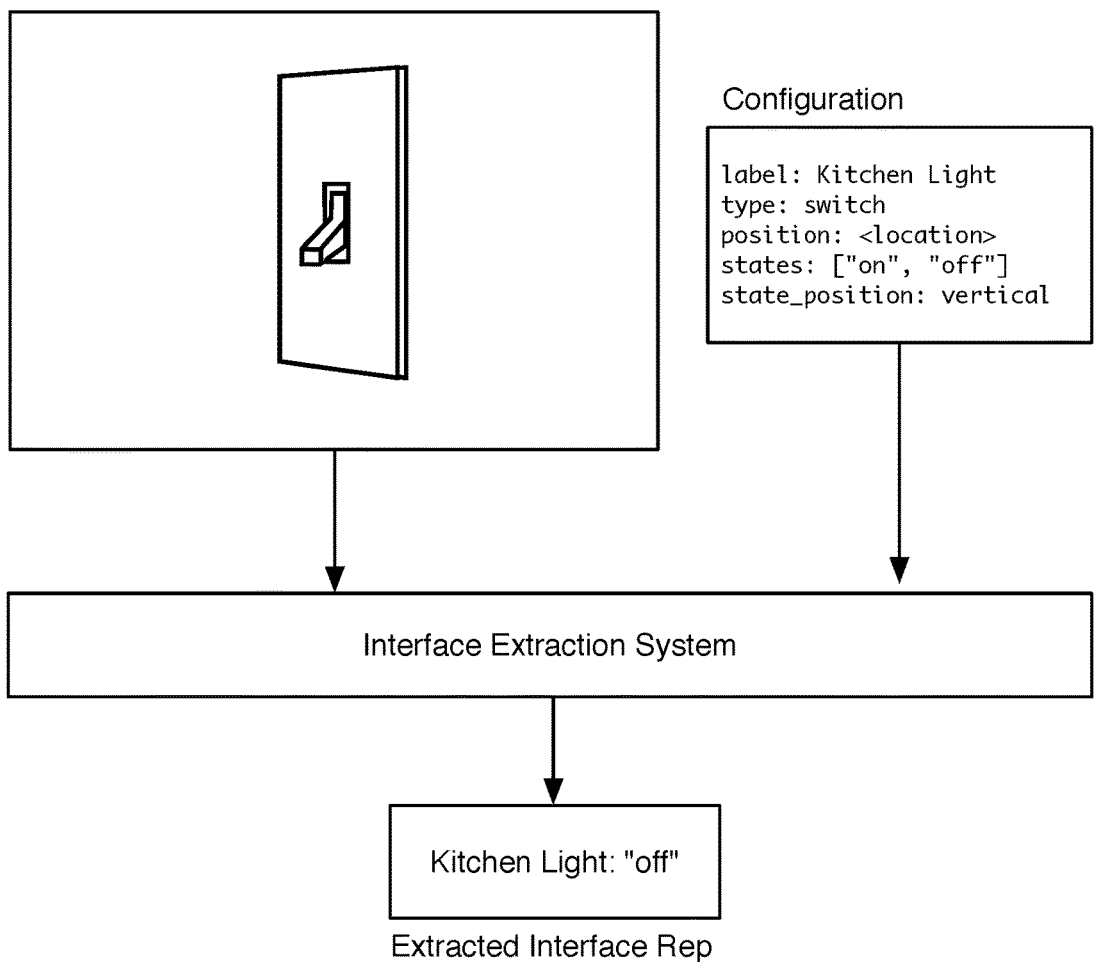
FIG. 19 is a graphical representation of the method applied to switch state extraction.

An indicator can additionally be used as a form of a switch extraction more, which functions to detect the positional state of a mechanism with two or more stable state configurations as shown in FIG. 19. The switch can be a light switch, a lever, or other suitable mechanism. Switch extraction can have similarities to indicator extraction and/or dial extraction. Preferably, the setting the operating properties includes setting the number of possible states and the respective labels or interpretation of each state. In some cases, some simple state machine logic may be configured as an operating property to specify the possible transitions between states.

Figure 20:
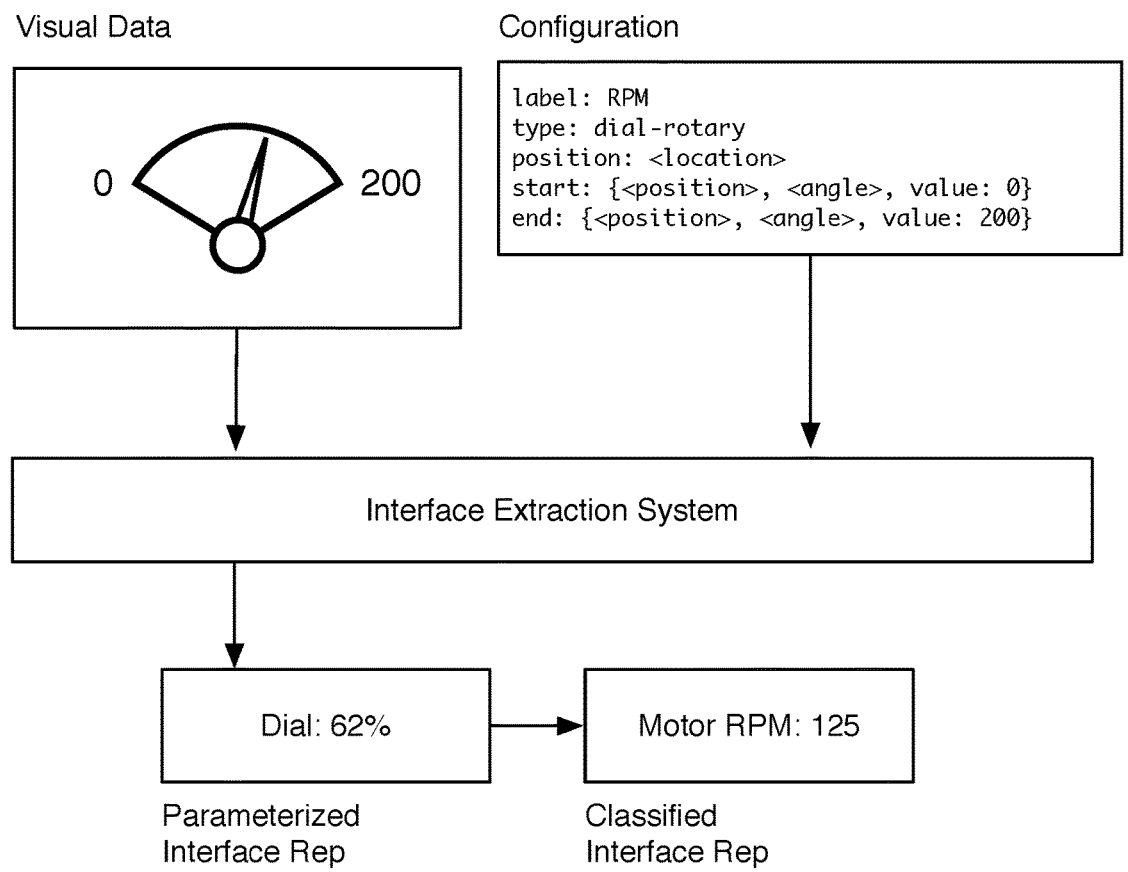
FIGS. 20 and 21 are graphical representations of the method applied to dial extraction.
Figure 21:
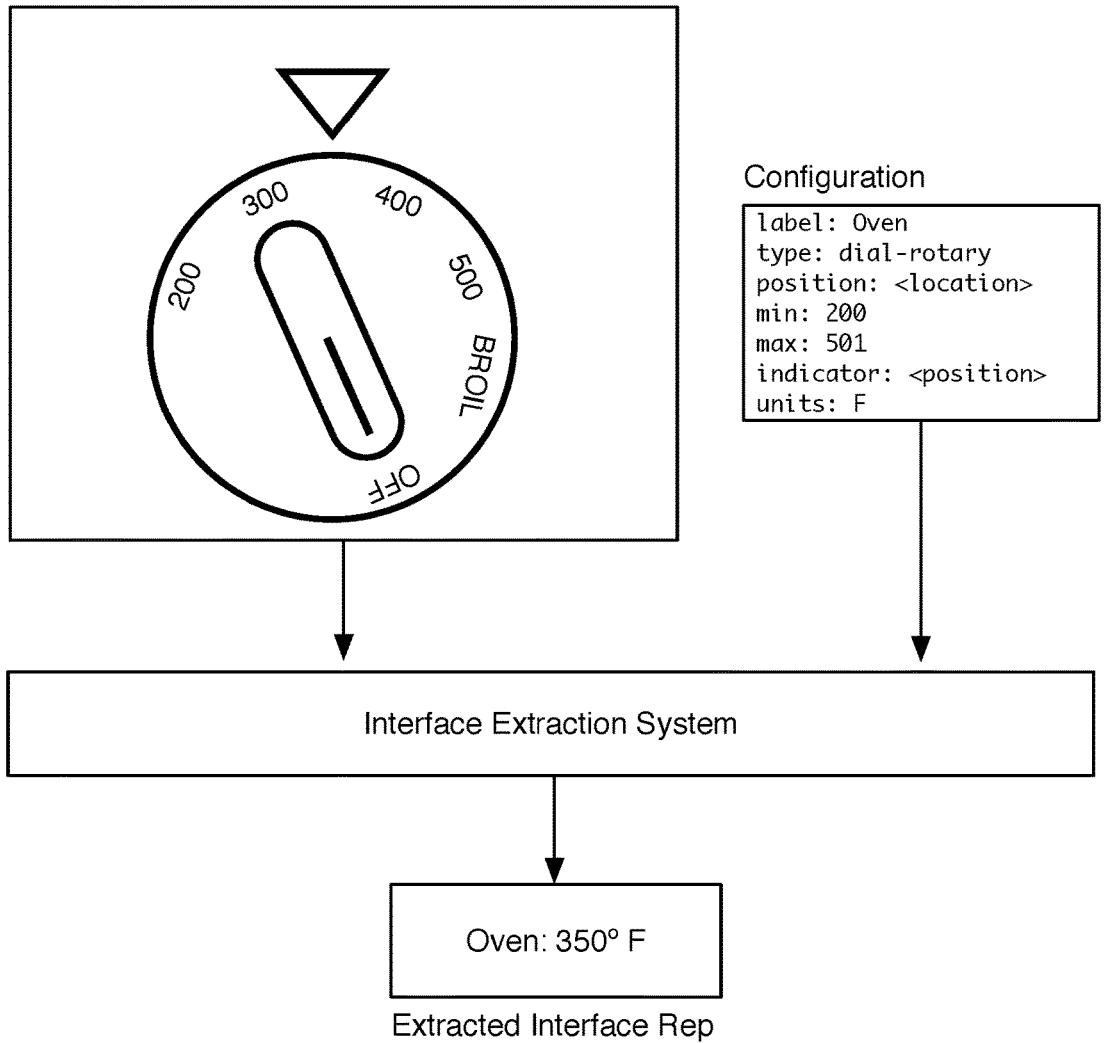

As shown in FIG. 20, configuring operating properties for dial extraction can include specifying the minimum range of the dial, a maximum range of the dial, intermediary values, the type of indicator, the path of the indicator, and/or other aspects. The intermediary values can be used to show how values vary along the path of the indicator. Values can vary linearly, logarithmically, exponentially, or with any suitable transfer function. The path of the indicator can be an arc for a radial dial. The path of the indicator may alternatively be linear for a linear dial such as a thermometer. When the dial device is actively used as a user interface output, the indicator is preferably visually distinct. When the dial device is used primarily as a user input, then the indicator may be indicated through the visual appearance of a knob or dial. For example, an oven dial may have a slight protrusion used to indicate its position (as well as serving as a grip for the user). In another variation, the dial may be reversed where the indicator is fixed and the value rotates as in the oven example shown in FIG. 21.

In some cases, a dial may be a continuous dial that can rotate continuously such as a clock hand. A sampling rate may be set based on the maximum rate at which the dial can rotate so that the method can monitor the continuous dial's progress. The starting position could be initiated when setting up the continuous dial so that subsequent rotation can be tracked.

Figure 22:
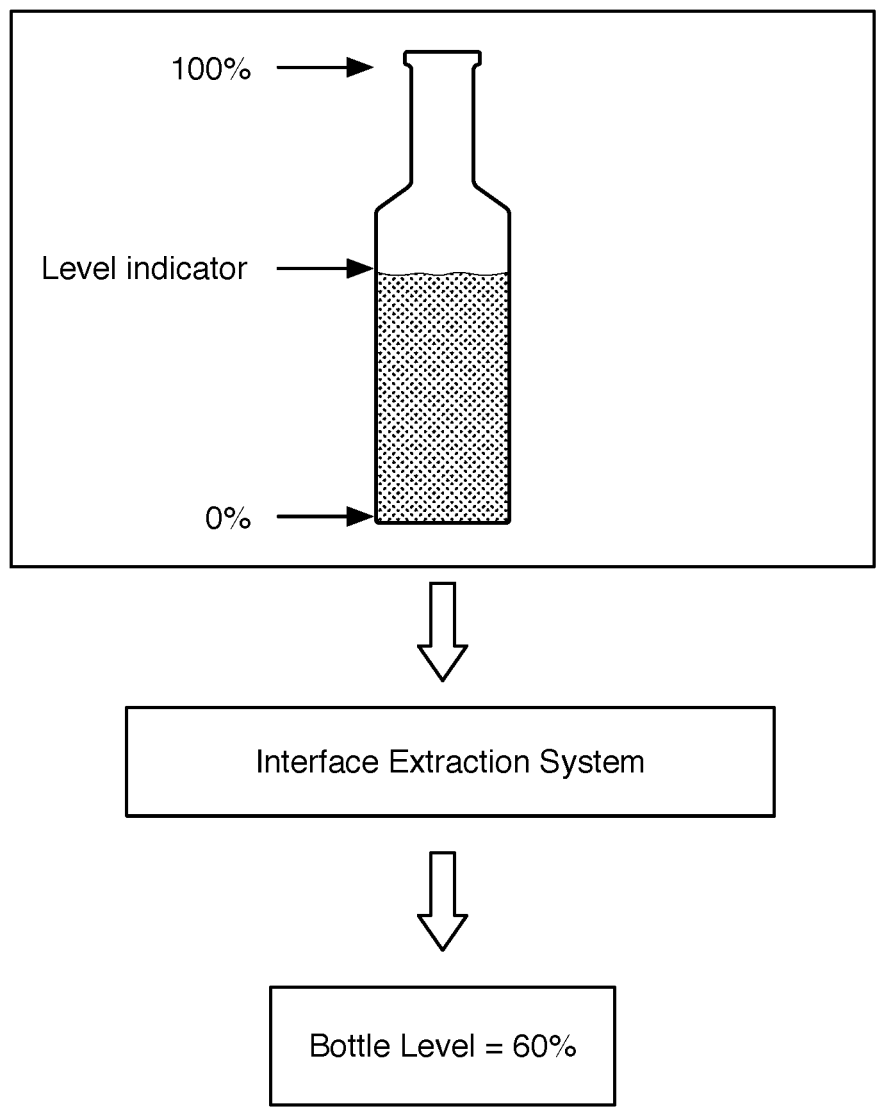
FIG. 22 is a graphical representation of the method used in a dial extraction mode applied to an analog device interface.

In some cases, a dial extraction may be configured to indicate progress of an element between at least two positions. Other forms of extraction may enable extraction of position in multiple dimensions. As shown in FIG. 22, the content level in a container could be treated like a dial with the content level acting as the indicator between the top and bottom positions, and the transfer function being proportional to the area cross section at each gradation. This could be used for bottles and/or other containers, where the contents can be treated as a linear indicator along a vertical scale. Deeper operating property customization, such as defining a mapping between indicator position and bottle volume, can enable extraction of volumes.

Figure 23:
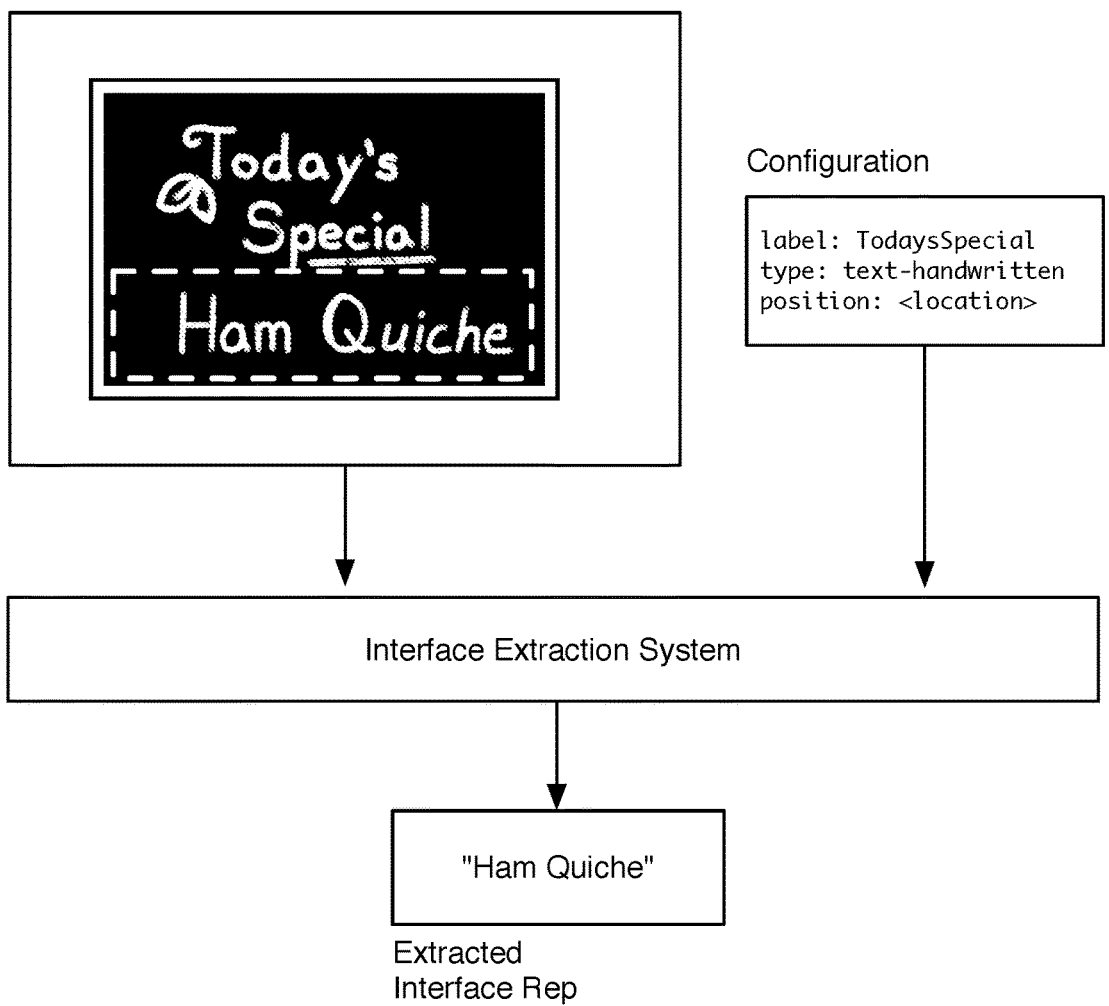
FIGS. 23 and 24 are graphical representations of the method applied to character extraction.
Figure 24:
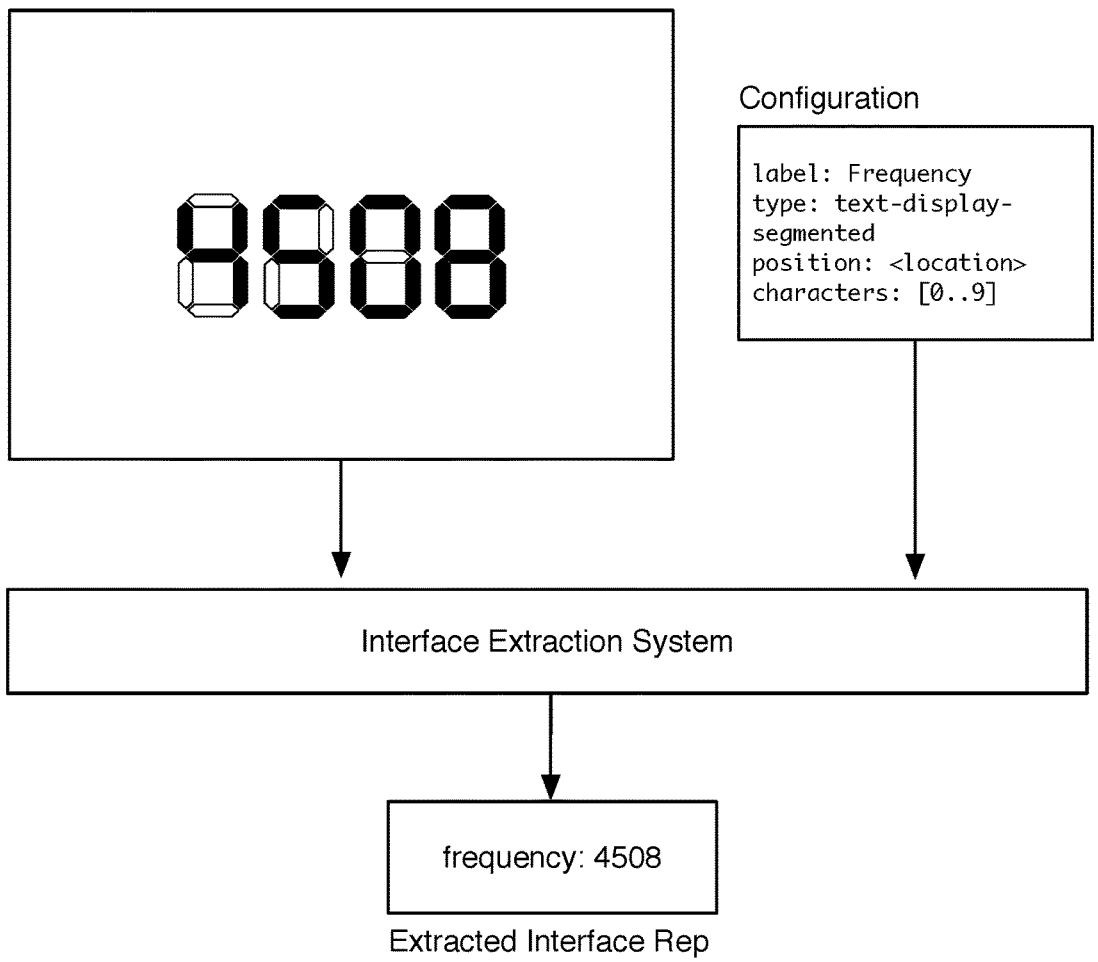

As shown in FIG. 23, character extraction functions to convert displayed, written, or printed alphanumeric characters into computer readable text data. Configuring character extraction can include setting the region where text is extracted and optionally properties of the text. The properties of the text can include valid characters (e.g., only numbers or only letters A-F), the number of characters, the font or format of the characters, the number of lines, the orientation of the characters, and/or other properties. As shown in FIG. 24, a seven-segment numerical display could be configured to convert the display into numbers representing the current frequency setting of the device.

Figure 25:
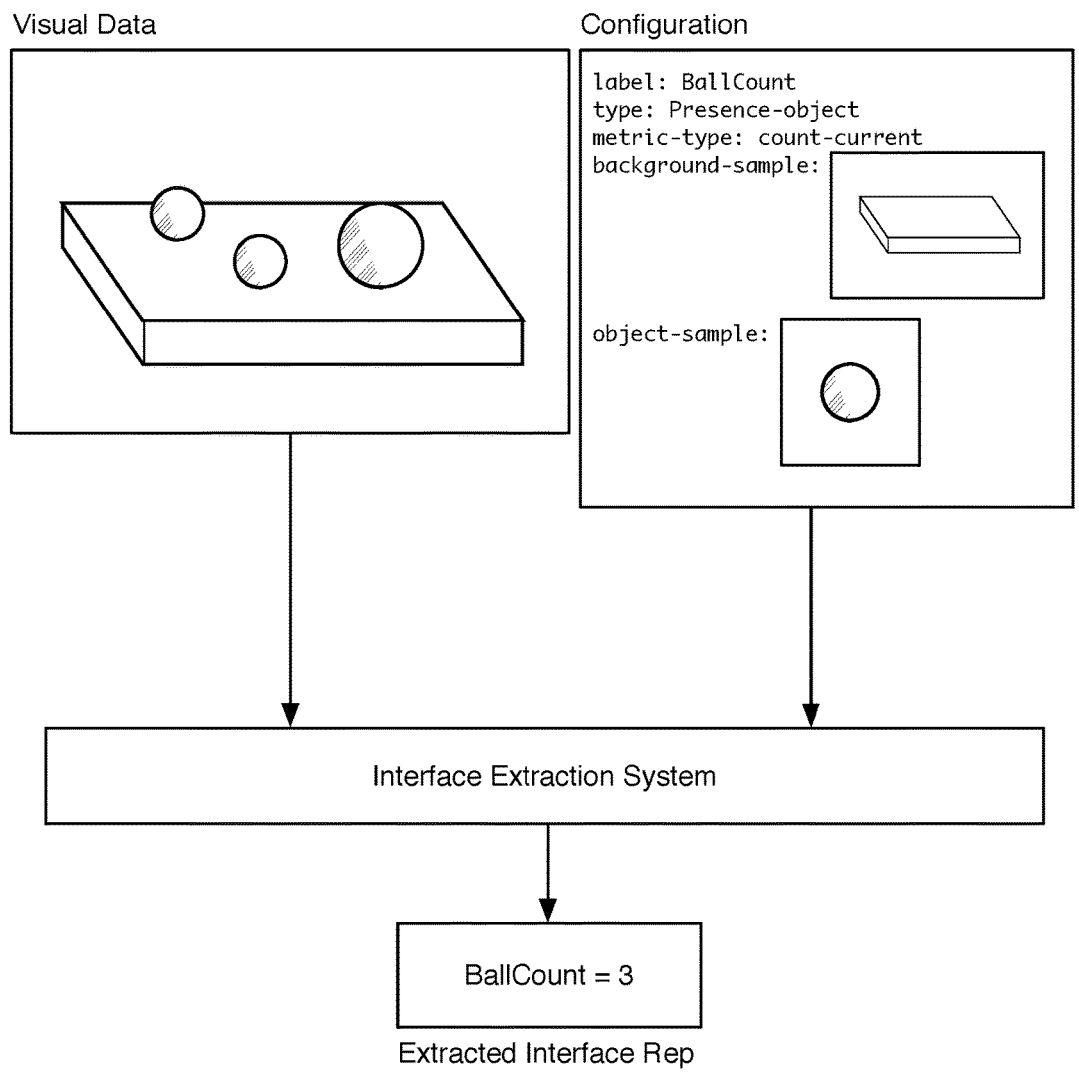
FIG. 25 is a graphical representation of the method applied to presence extraction.

As shown in FIG. 25, configuring presence extraction can involve setting a background region for detecting presence and setting the conditions for a presence event. Presence extraction can be used to detect when any object enters a space. Presence can be detected by comparing the image data to image data of the background region. The background may be initially set by capturing the image data of the background region with no foreground objects. The method can additionally build an understanding of the background region over time. For example, the method could learn the visual appearance of the background region under different lighting conditions. Conditions for a presence event can be a set of conditions based on properties of foreground objects. Properties of foreground objects can relate to the size of the object, the shape of the object, the visual texture of the object, the color of the object, or general appearance of the object. In one implementation, image recognition is performed on a foreground object. Presence extraction can be set to indicate if one or more types of objects are present. In one variation, configuring presence extraction can include setting the set of detected object classifications. The set of object classifications may be selected from a set of possible object classifications. In one variation, a customized deep learning neural network model for object classification of a set of objects may be used. Facial or biometric classifications can additionally be used in detecting presence. Presence extraction may alternatively be configured to count the number of objects present currently or over time. Presence extraction can additionally be used with other forms of physical state detection such that color profiles, size, shape, and/or other detectable attributes can be collected in addition to or in response to detection of some object presence.

In some cases, presence detection may be applied in combination with other types of extraction and/or other data collection processes. For example, different tasks or processes may be conditional on detecting (or not detecting) one or more objects. In this way presence may provide context to other forms of data extraction and processes. For example, changes in a light switch may be conditionally extracted when a human is present in the image data.

Presence detection can additionally be applied in a movable device variation, where the location of a device interface source may not be known or static. Presence detection can be configured such that block S130 can enable detecting one or more configured objects and, in response, collecting data (i.e., contextual data). Collecting data in one variation can be performing some type of interface extraction. The interface extraction can be set through extraction configuration that is associated with the object or objects. For example, character extraction can be configured to extract the time displayed on a parking meter when the parking meter object is detected. Collecting data in another variation can include recording of metadata at the time of detecting the at least one type of object and associating the metadata with the extracted interface representation. Metadata may include location, position, position of the object, time of day, audio data, application state of a device, and/or other forms of data collectable from the imaging device, an application/device in connection with the interface extraction system, a third party service, and/or any suitable source. In one example, presence extraction can be used to detect car keys and to record geographic location upon detection of the car keys. In this way, a user could configure a movable camera (e.g., a wearable camera) to track the last location where the car keys were seen.

Figure 26:
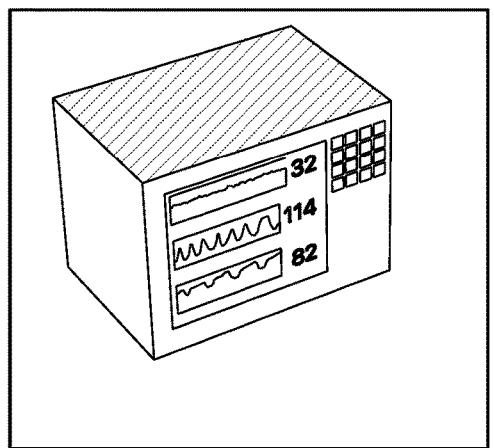
FIG. 26 is a graphical representation of the method applied to device model extraction.

As shown in FIG. 26, configuring operating properties of a device model extraction may include setting device model options. In one variation, a number of device models are provided for interpreting stateful computing devices and their respective device states. In this option, configuring the operating properties of a device model may be simply selecting one of the device models and selecting data extraction information options that are of interest for a particular application. Alternatively, a device model can be specified through a device model profile, application, or other programmatic specification of the device states and directions on how to extract information from the image data during different device states. As a stateful device, a device interface source may present different information in different ways in different conditions. Device model extraction will generally use multiple variations of the above forms of extraction in setting how to extract information data from image data. For example, character recognition in combination with indicator detection may be used to extract different data feeds of information where it is intelligently extracted and associated with a data feed based on detected indicators. Audio interface signals may additionally be used.

Figure 27:
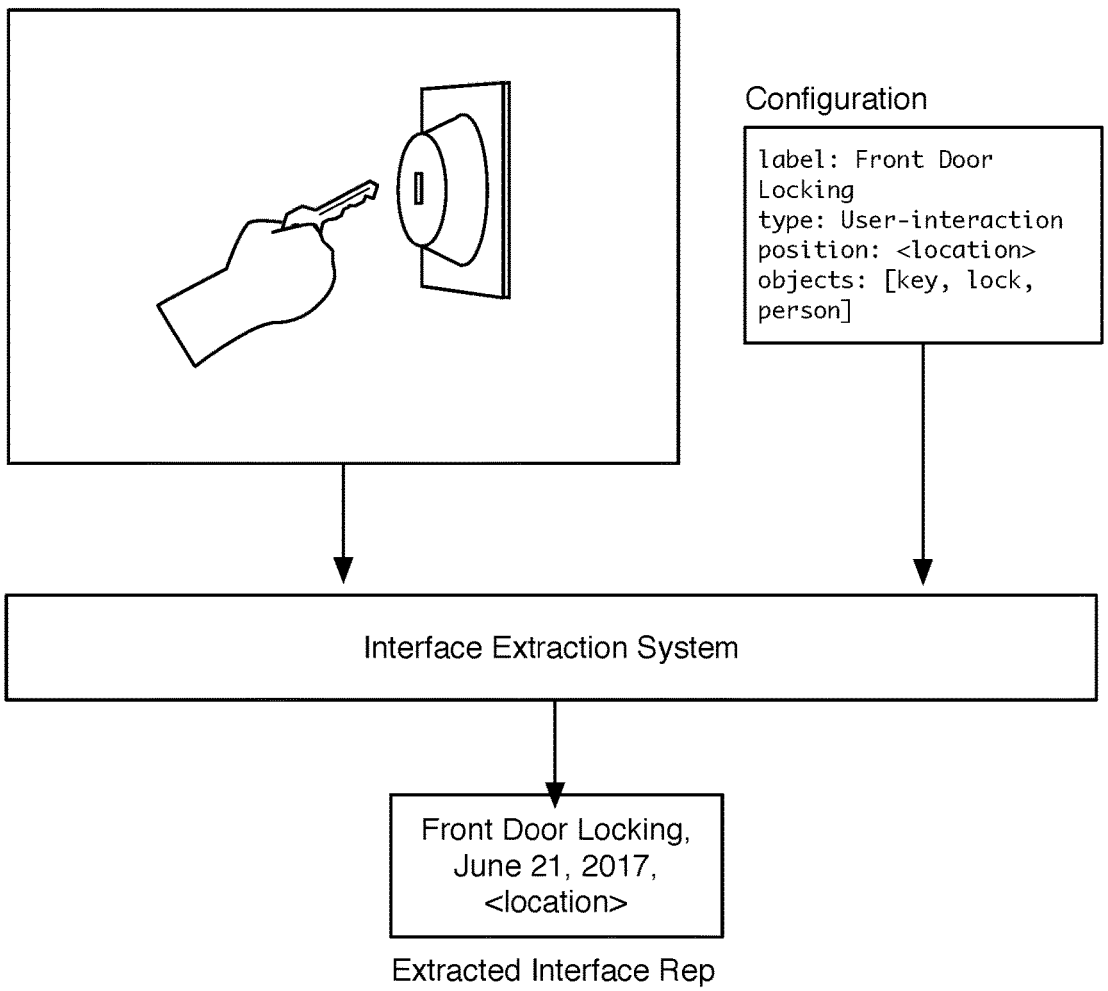
FIG. 27 is a graphical representation of the method applied to gesture extraction.

As shown in FIG. 27, configuring gesture detection can involve selecting a detectable gesture and/or gesture conditions. In one variation, a gesture extraction mode can be a basic form of presence detection where a gesture is generalized to proximity of two or more detectable objects. Alternatively, particular actions may be trained and detectable a computer vision model. Gestures may be actively performed actions for input, but could alternatively be natural actions that can be interpreted as a gesture. Hand gesture, facial expressions, or other actions can be detectable forms of gestures. Custom gestures, actions, or events could be trained and used for a particular gesture extraction. Gesture detection may be reactive to presence detection. However, gestures may alternatively be linked to detection at a particular position. In one exemplary application, the gesture of locking a door lock with a key may be a detectable gesture. The physical action of locking may be detectable through computer vision. Alternatively, gesture detection could be composed of detecting presence of a person, a key, and the lock within some threshold of near proximity and/or making contact.

Block S124, which includes registering visual markers on a device interface source, functions to use visual markers in facilitating configuration. The visual markers could be stickers, marks, or attachments that can be physically added to the device or otherwise augment how the device is perceived. The visual markers are preferably visually distinct and made of a distinguishable color and/or graphical pattern. Additionally, the visual markers could have a machine readable code such as a QR code or a barcode. The machine readable code is preferably set to an identifier. The identifier can be used to indicate different things such as the purpose and meaning of the marker and how it should relate to extracting information.

Two preferred variations of using visual markers can include using the visual markers in specifying at least a portion of extraction configuration and/or using positioning of visual markers in setting at least a portion of operating properties. As discussed above, a pairing mode is another potential application of visual markers, but they may alternatively be used in other ways.

Figure 28:
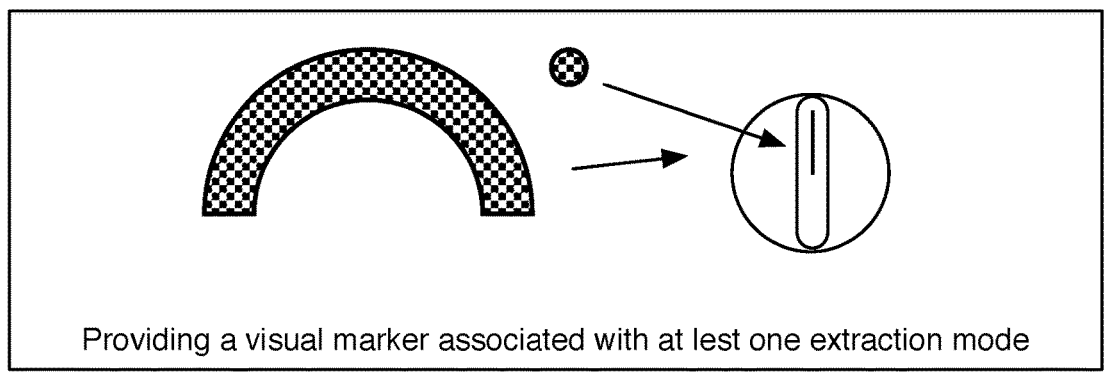
FIG. 28 is a schematic representation of an exemplary process using visual markers.
Figure 28:
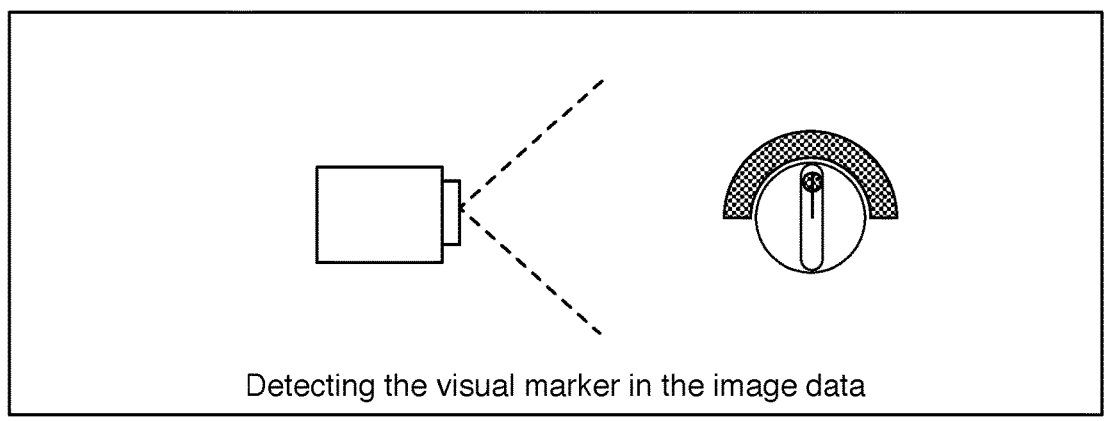
Figure 28:
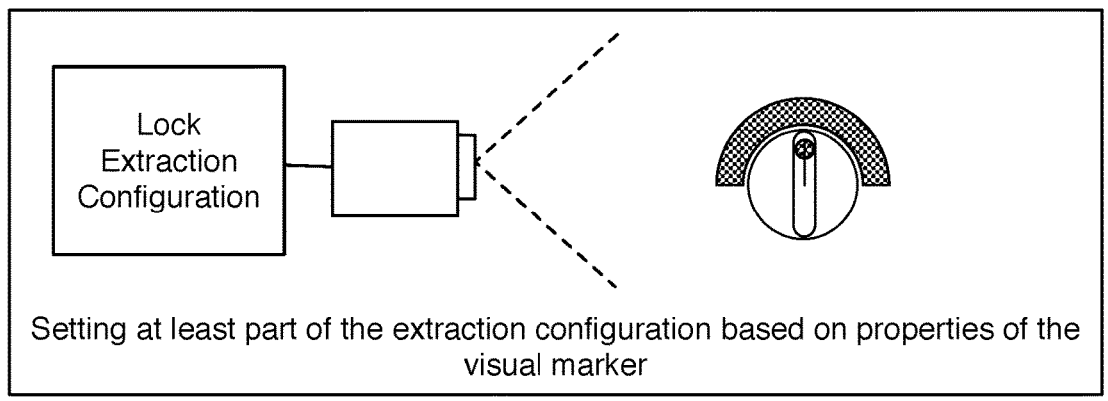

In a variation where visual markers are used to specify at least a portion of extraction configuration, visual markers may be placed on different device interface sources where the visual markers indicate extraction configuration. Detection of a visual marker can indicate position of a device interface source but may additionally indicate an extraction mode. Accordingly, the method can include providing a visual marker associated with at least one extraction mode, detecting the visual marker in the image data and setting at least part of the extraction configuration based on properties of the visual marker, wherein position, extraction mode, and/or device interface operating properties can be set as shown in FIG. 28. In one variation, the visual markers may visually represent an identifier. The identifier can be used in accessing extraction configuration associated with that identifier. The identifier can be unique such that the extraction configuration can be uniquely customized. The identifier may alternatively not be unique where it can reference an extraction configuration that can be shared across multiple device interface sources. Alternatively, the visual markers may represent some visually encoded message that embeds the extraction configuration properties. In this variation, the visual marker may be used without needing access to a database of associations. In this variation, common extraction configurations may be associated with visual markers that can then be positioned or attached to different device interface sources of interest. Image data containing that capture the visual marker will then be automatically processed using the extraction configuration.

Figure 29A:
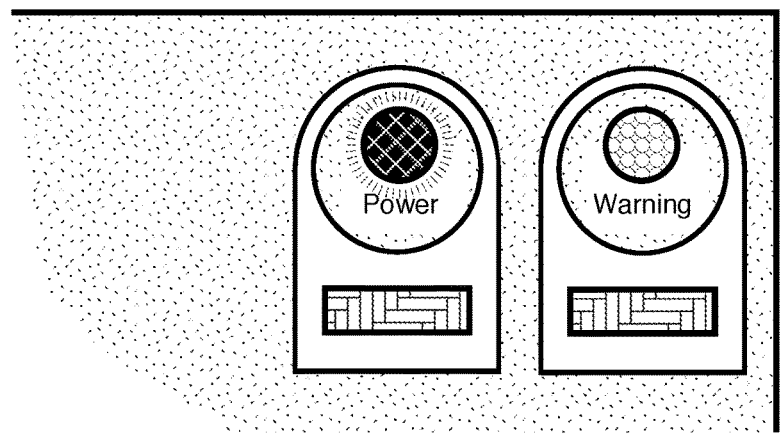
FIGS. 29A-29C are schematic representations of visual marker stickers used for configuration and detection.
Figure 29B:
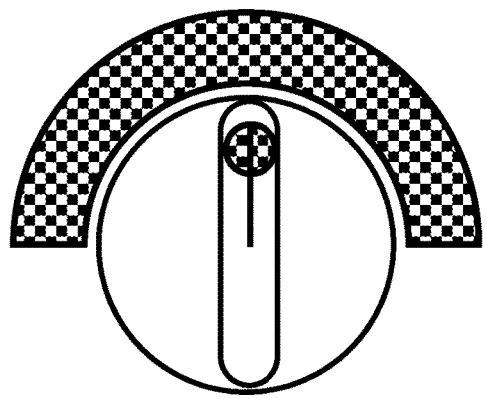
Figure 29C:
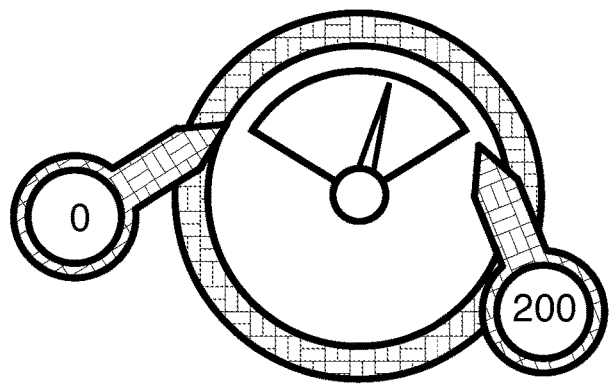

In another variation, visual markers may be used in marking different aspects to assist in the extraction of information. This variation preferably leverages different visual markers to augment a device interface source so as to make it more easily or reliably interpreted. This variation may include providing a set of visual markers, such that the combined positioning of the set of visual markers as detected in the image data at least partially define extraction configuration of the device interface source. Visual markers may have attributes to specifically configure particular aspects of extraction configuration. Different types of visual markers may be used to configure the position of a device interface source, the type of extraction, and operating properties as shown in FIGS. 29A-C.

A position setting visual marker may be used to mark where a device interface source is located and possibly set the dimensions of associated image data. A position visual marker may be a box that can be placed to circumscribe a device interface source. Other systems of a visual marker could alternatively be used.

An identifier on the visual marker may indicate the type of extraction to be used. Element visual markers may be used to characterize the operating properties of the device interface source.

Operating property visual markers may be used to specify different operating properties. The positioning of a property visual marker can convey some information used in setting an operating property, the type or label of an operating property visual marker may additionally be used. For example, a min-value visual marker and max-value visual marker may set the range of a dial. An operating property visual marker may additionally include variable fields where information can be included to set variables. These may be used in combination to set multiple operating properties. For example, dial-based visual markers may visually mark the minimum value, intermediary values, maximum value, orientation of an indicator, path of the indicator, and/or any suitable operation property.

Figure 30:
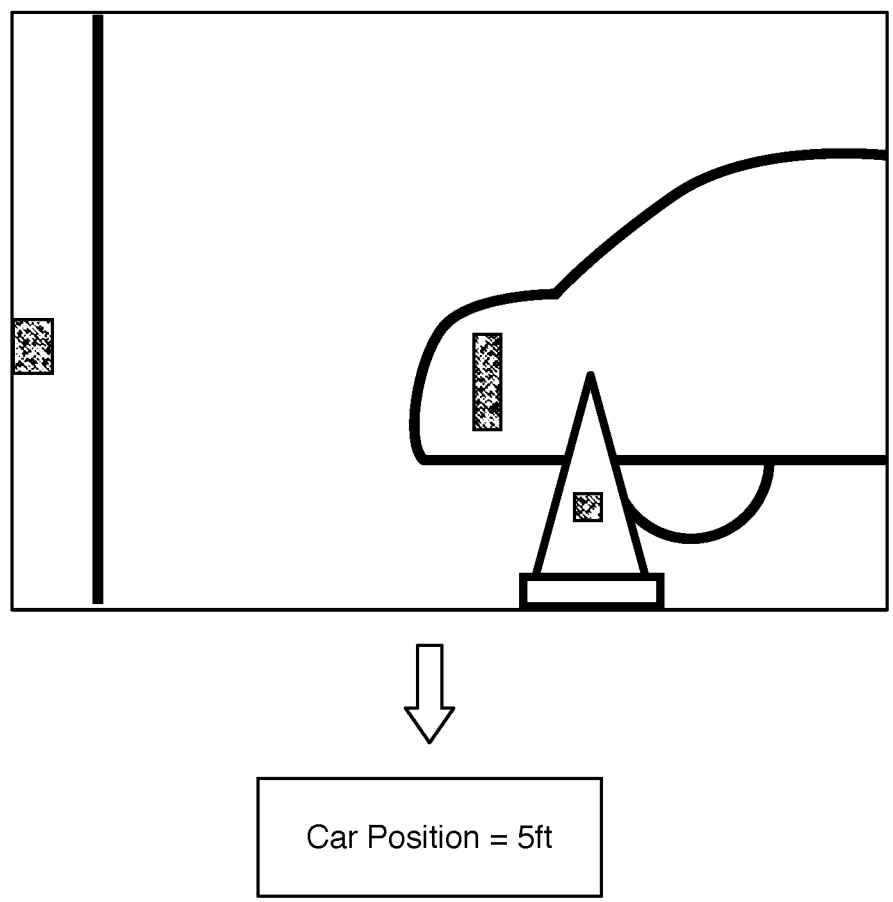
FIG. 30 is a schematic representation of a device augmentation to convert device interactions into a interface output.

Once placed, visual markers are preferably detected and used to automatically configure aspects of the device interface source. The visual markers can act as a physical approach to normalizing detection of different types of devices. They may additionally be used to artificially make particular device(s) be perceived as a different type of device. For example, dial extreme markers can be placed on a cone and wall of a garage with another marker on the front of a car to convert a car pulling into a garage as a progress bar dial as shown in FIG. 30.

Figure 31:
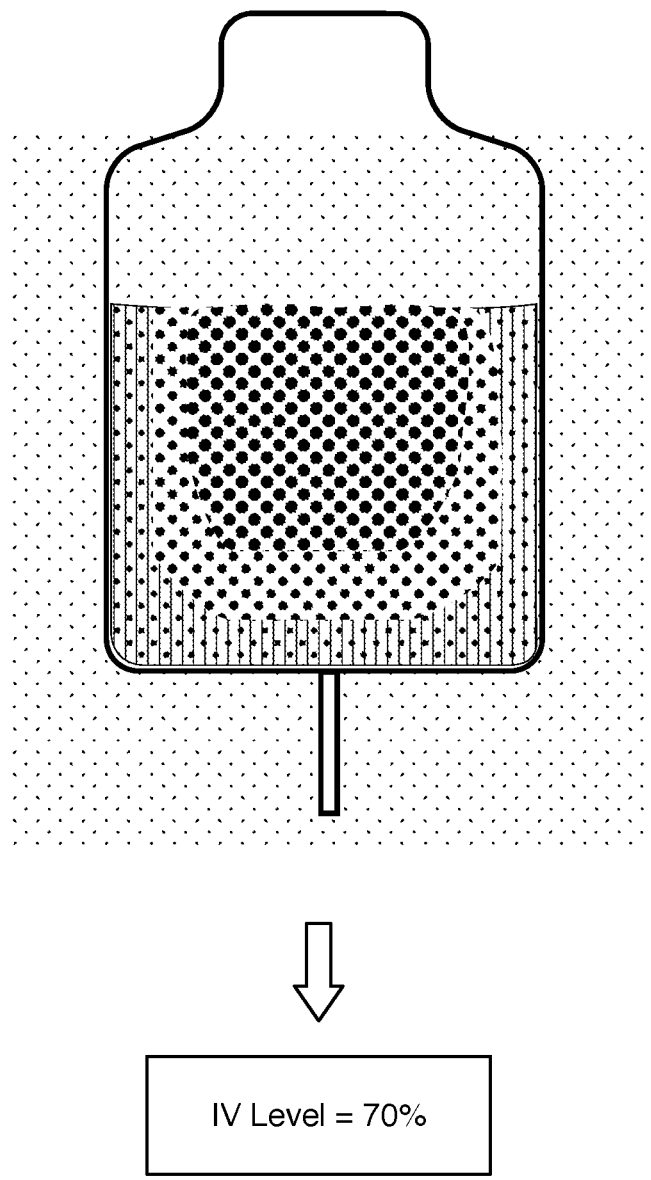
FIG. 31 is an exemplary schematic representation of interface output extraction applied to an IV bag.

In another exemplary application, the method could be applied to an IV bag. The IV bag could be a common IV bag such as a drip or pump system, which enables existing equipment to be used. The IV bag may be augmented to enhance the fluid level presence. In one variation, a light could be used to illuminate the fluid to enhance detecting its level. In another variation shown in FIG. 31, a graphical pattern could be place in the background. The optical disruption of the pattern caused by the fluid could be differentiated from disruption caused by just the bag, and the fluid level could be derived from this observation.

Visual markers could similarly be applied to other applications of monitoring liquid contents of an at least semi-transparent container. For example, a bottles of liquid could similar be monitored. A visual marker strip could be adhered to the back of the bottle. Alternatively, a visual marker background could be positioned such that the bottles of interest are been the visual marker background and the imaging device. The visual graphical pattern in this variation may be a graduated pattern with continuous or discrete segments of different identifiable levels. The level of the liquid can correspond to marked liquid levels based on the detection of a graduated pattern.

In a similar variation that does not utilize augmentation the method could learn the background visual representation and use a similar approach to optical disruption to identify the fluid level.

Figure 32:
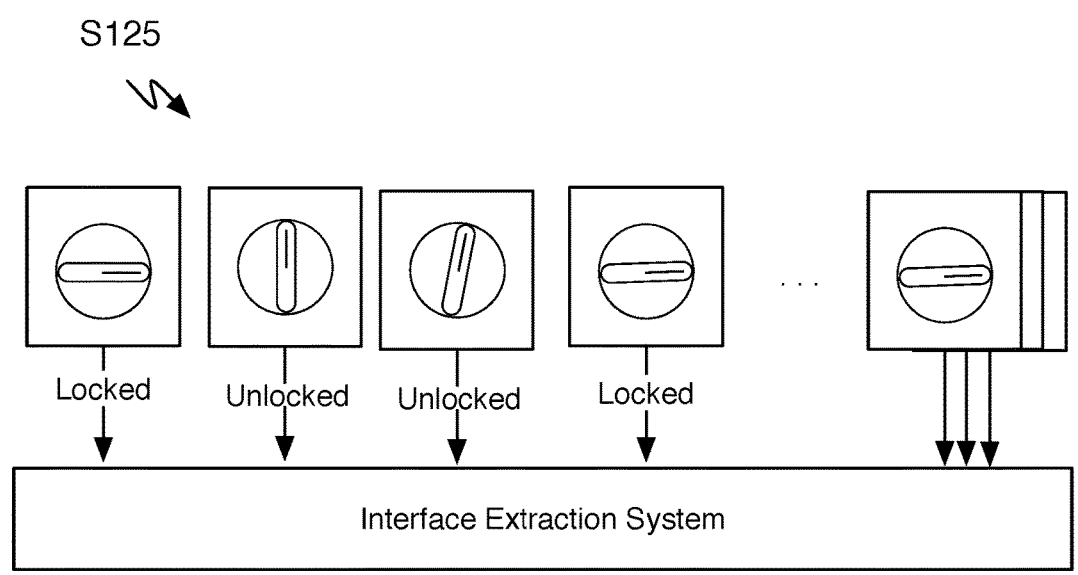
FIG. 32 is a schematic representation of training extraction of the device interface source.

Block S125, which includes training extraction of the device interface source, functions to use machine learning in understanding the informational classification of image data as shown in FIG. 32. Training could be performed during an initialization process, but may additionally or alternatively be performed during operation. Training preferably involves collecting a training set of image data and generating a model for associating the image data of a device interface source with various values. The training may be beneficial in scenarios where the device interface source does not perfectly map to one of the available types of extractions. Training may be an alternative approach to configuring. For example, instead of setting up how a dial works, a user could show the imaging device a number of possible dial positions and input their associated values. The interface extraction system can alert the user when enough samples are collected. The interface extraction system does not need to have samples for a full set of possible values because, the method could interpolate the visual detection of un-trained values. The training and automatic detection of device state can be performed using computer vision, deep learning, neural networks, and/or other suitable forms of machine intelligence.

Block S130, which includes processing the image data associated with the device interface source into an extracted interface representation according to the extraction configuration, functions to interpret the device interface source. As discussed one or more device interface sources can be extracted simultaneously from the image data. Additionally, one device interface source may have one or more types of extraction applied to the image data of that device interface source. In some cases this may result in multiple data streams of extracted interface representation. An extracted interface representation is preferably a data object that reflects the state of the device. Various embodiments of the method may provide one or more types of representations such as a rendered interface representation, a parameterized interface representation, a classified interface representation, and/or any suitable analyzed representation.

A rendered interface representation can be a virtual rendering or an image-based rendering of the interface. The rendered interface representation can provide a visual representation. An image-based rendering can be a formatted version of the device interface source as captured in the image data. An image-based rendering may be saved and used to provide the base truth of the state of device interface source. A virtual rendering can be a simulated visual representation that can be constructed from a parameterized or classified interface representation. A rendered visual representation in some applications can be streamed or provided as a visual representation to accompany a machine translation of the information.

A parameterized interface representation can be a machine-readable representation of the interface. In some variations, an initial form of parameterized interface representation can be a conversion of image data of a device interface source to a data representation. This can include reducing the components of the interface into its base components. An example for a dial device interface source would be the dial angle and position relative to the dial range. Those parameterized representations of the base components may then be converted to a classified interface representation. A classified interface representation is preferably achieved through characterizing informational data from a base parameterized representation. In some cases, processing of the image data may bypass any intermediary form by using image classification, feature extraction, or other CV-based approaches. Alternatively, the parameterized interface representation of base components may be used as inputs used in generating the classified interface representation.

The classified interface representation, or in other words an informational data representation, is a type of a parameterized interface representation data format that provides the symbolic meaning of the interface and is generally what an informed user would interpret from viewing the device. In the dial example used above, the classified interface representation would be the indicated value of the dial.

An analyzed representation can be a higher order data information format resulting from applying high level logic, statistical analysis, and/or understanding of the information conveyed in the device interface source. The analyzed representation can be the result of applying high level logic and processing of the information as applied to the extracted interface presentation, and may use historical data, other data sources, and/or other resources in performing the analysis.

Figure 33:
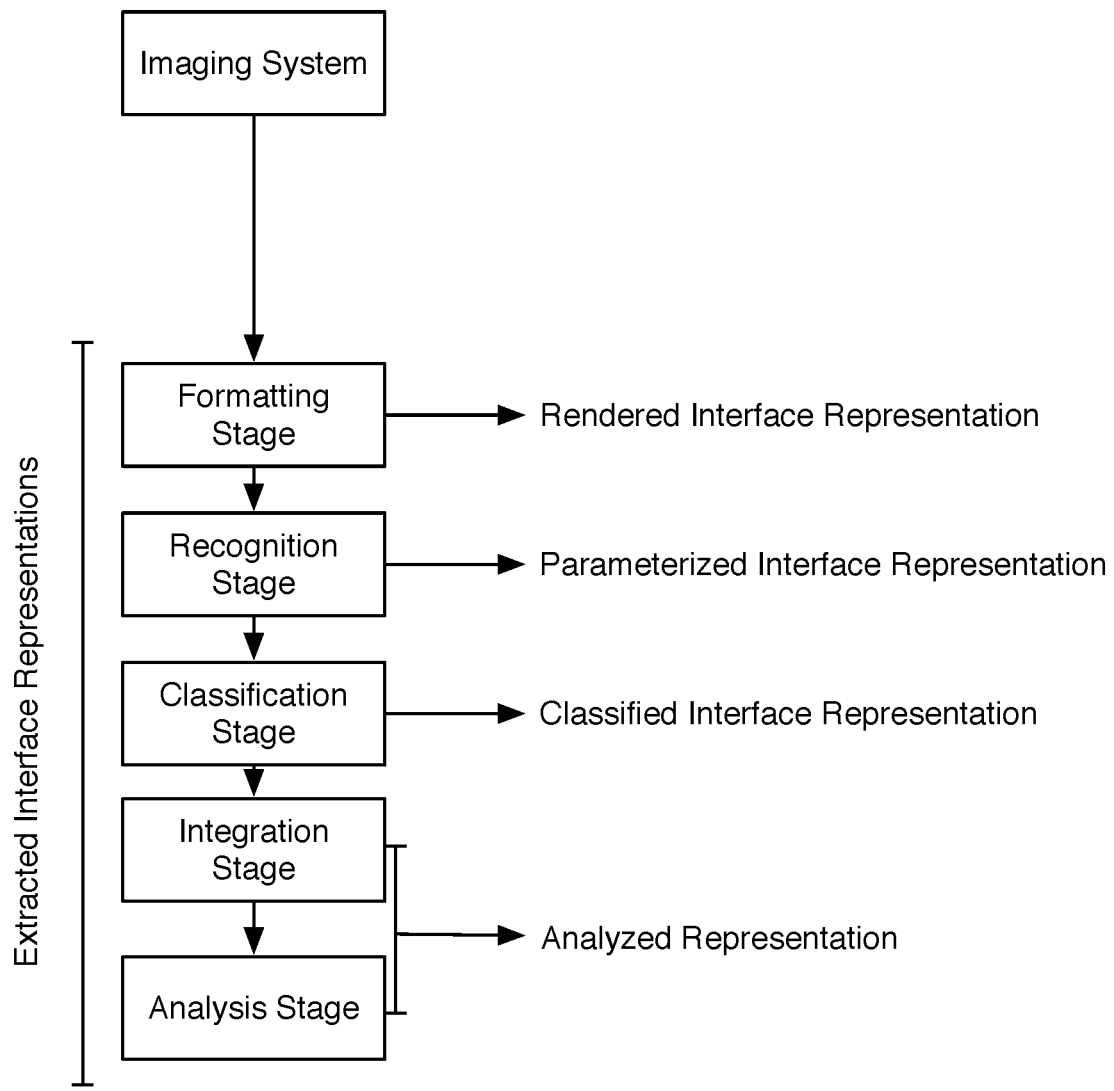
FIG. 33 is a flowchart representation of a processing pipeline.

One or more of these extracted interface representations may be exposed as shown in FIG. 33. In one preferred implementation, the extracted interface representation can expose a classified interface representation and the image-based rendered interface representation so that the ground truth of the classified interface representation can be inspected.

The extracted interface representation is preferably stored in association with a timestamp and can be periodically updated such that a longitudinal history of an extracted interface representation can be established. In some cases, however, a single or set of isolated snapshots of an extracted interface representation may be produced. As the extracted interface representation may not be collected with at regular intervals, data flagging or eventing may be triggered in response to issues in generating an extracted interface representation.

The processing of the image data may be scheduled such that it is executed at set intervals. The processing of the image data may alternatively be responsive to detection of the device interface source. A device interface source detection process can be executed continuously or periodically on the image data, and upon detection of the device interface source, the image data can be appropriately processed. This can be particularly applicable to variations using a movable imaging device, where the device interface source may not always be present or located in the same region. The processing of the image data may alternatively be triggered through some input. For example, when integrated with a digital camera, the processing can execute after capture of the image data. In another example, a programmatic command may be communicated to an imaging device to capture image data and process the image data.

Figure 34:
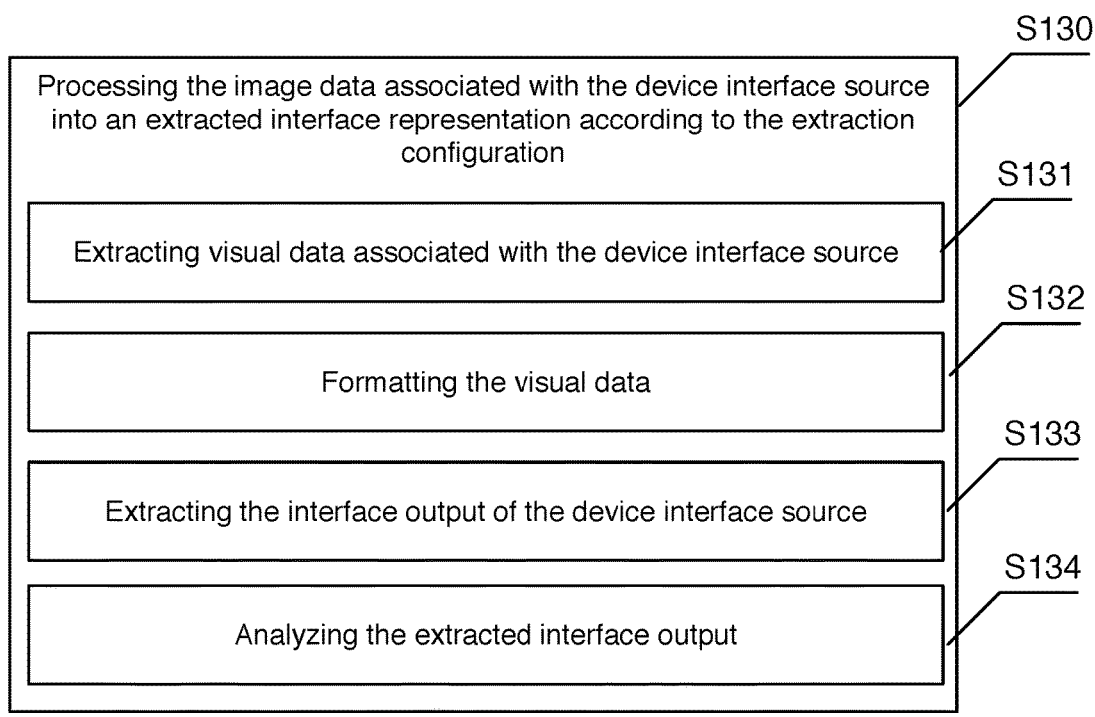
FIG. 34 is a detailed flowchart representation of processing the image data.

Processing the image data can include a number of processing stages, which may involve a visual formatting stage, recognition stage, classification and data formatting stage, and/or analysis stage. Accordingly, processing of the image data can include extracting image data associated with the device interface source S131, formatting the image data S132, extracting the interface output of the device interface source S133, and/or analyzing the extracted interface output S134 as shown in FIG. 34.

Block S131, which includes extracting image data associated with the device interface source, functions to isolate the image data associated with the device interface source. Multiple cropped segments of image data can be created from the image data if multiple device interface sources are present.

In some variations the position of the device interface source is substantially static and configured in the extraction configuration. The selection of a sub-region of relevant image data can be directly performed based on the configured position of the device interface source. In a narrow-field of view variation, the device interface source may be expected to substantially fill the field of view.

In other variations, block S131 may include detecting a device interface source and the position of the device interface source. This may be achieved through object recognition using CV-based approach. This could alternatively be achieved through detection of a visual marker or other suitable approaches.

Block S132, which includes formatting the image data, functions to prepare, normalize, and/or rectify the image data as part of the visual formatting stage. In some variations, the image data transformations prepare the image data for subsequent stages of processing or for a rendered interface representation. The formatting the image data may additionally be used in generating a rendered interface representation that can be part of the extracted interface representation output.

Various visual transformations can be made including geometric transformations and imaging transformations. In one basic form of formatting the image data, the image data can be cropped to a region of interest for the device interface source. For example, the image data may be converted to one or more sub-images that are cropped to some bounding box around the device interface source or some region of interest for the device interface source. The visual transformations are preferably specifically customized for regions of image data associated with different device interface sources such that each device interface sources can be normalized into an extracted interface representation. If there are two or more device interfaces sources captured by a camera, each device interface source can be transformed individually. Image data transformations are preferably applied directly on the image data, but can additionally include altering the configuration of an imaging device to transform image data though altering the image data collection process.

Geometric transformations can rotate, skew, distort or otherwise morph the geometry of one or more regions of the image data of an interface to account for perspective. Accordingly, the viewing angle of a device interface source can accommodate rotation and non-normal viewing perspectives. For example, screens viewed off angle are transformed to remove key-stoning in order to produce regular rectangular images with aspect ratios that might match that of the screen of the original device. The amount of visual transformation can additionally be used to characterize the quality of the collected data (i.e., the capture status). For example, a screen viewed from an extreme angle (e.g., eighty degrees off of a straight-on view) may be less reliable. Reliability of the source of the extracted interface representation can be stored as a quality data property. The data property can depend on the base image data and/or other aspects such as confidence in translating image data to a parameterized value.

Other visual transformations can include imaging transformations, which functions to adjust the color space of the image data for enhanced legibility and/or processing. As with other image data transformations, imaging transformations can be customized to different regions of the image data. Imaging transformations can include adjusting the color space, brightness, contrast level, saturation level, hue, sharpness, white point, black point, and/or altering any suitable imaging variable. Filters or other image transformations may additionally be performed. The type of imaging transformations can be based on the type of extraction.

Block S133, which includes extracting the interface output of the device interface source, functions to convert image data related to the device interface source into some form of a parameterized interface representation. A parameterized interface representation preferably includes a classification and data formatting stage wherein a classified machine readable representation of an interpretation of the device interface source is produced. For example, the image of a dial can be converted to the interpreted meaning of the observable dial setting. In some variations, extracting the interface output may additionally include a recognition stage where components of the device interface source are detected. For example, a parameterized description of the position of the dial and the range of the dial in a generic description.

Figure 35:
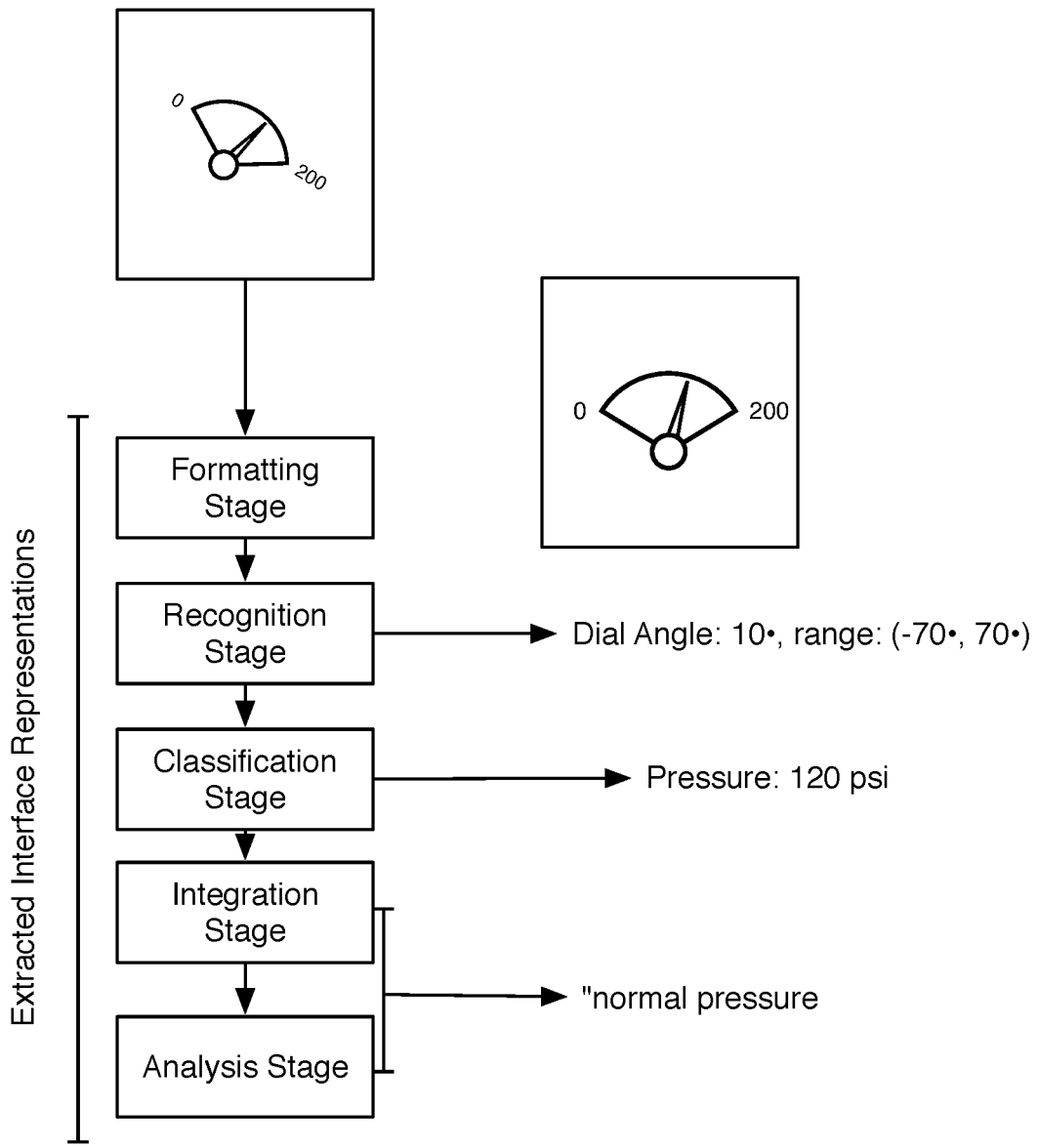
FIG. 35 is a flowchart representation of an exemplary processing pipeline for a dial.

In a recognition stage of extracting the interface output, visually represented information is preferably converted to a base parameterized interface representation. Accordingly, processing the image data may include extracting a parameterized representation of the formatted image data. The parameterized interface representation can be used in providing a lower level interpretation of the device interface source in between performing image processing and obtaining a classified interface representation. A base parameterized interface representation is a parameterized data representation of a visual description of the interface. In one variation, the parameterized interface format of a device interface source can be a data object with an array of graphical elements where each graphical element can have detected text, color properties, a location property, size properties, orientation properties and/or other properties. The properties of a data object for a base parameterized interface representation may depend on the type of extraction. For example, a segmented character display can include a first set of properties and a dial can have a second set of properties. Alpha/numerical characters are preferably recognized through optical character recognition (OCR) techniques or other processing techniques. A dial may be represented as an angular or linear position of the dial indicator as shown in FIG. 35.

In a classification and data formatting stage of extracting the interface output, the nature of the device interface source is interpreted into a classified interface representation also referred to as informational data. The classified interface representation is a data format that provides the symbolic/informational meaning of the interface and is generally what an informed user would interpret from viewing the device. A classified interface representation is preferably achieved through characterizing informational data from a base parameterized representation.

A base parameterized interface format may be used to determine the symbolic meaning of the interface output. In one variation, a parameterized representation of the image data can then be characterized into a classified data representation, which provides more informational data that reflects the conveyed information as opposed to a parametric description of the appearance of the interface. Alternatively, the image data may be used directly such as when using computer vision and machine intelligence to classify the meaning of the image data. The base parameterized interface format preferably represents the main components that define the mechanics of how the device interface source operates. The base parameterized interface representation can be logically analyzed to generate the classified interface representation. For example, a dial may have a minimum value representing zero at a first location, a maximum value representing 100 at a second location, and an indicator currently at a third location halfway between the minimum and maximum. This exemplary parameterized interface representation can be converted to a classified interface representation of fifty. The base parameterized interface representation may alternatively be used as input for machine learning analysis.

The units assigned in the classification stage may be dynamically determined from the presented interface output but could alternatively be pre-configured during block S120. For example, a user may specify that the number characters read on a digital character display represent the temperature in Fahrenheit. Additionally formatting rules can be set to appropriately format the parameterized interface representation.

In one implementation for a type of extraction, computer vision classification may be applied in translating from image data to an extracted interface representation and more specifically a classified metric representation. As one potential solution for extracting an interface representation, the method may apply deep learning, neural nets, and/or other forms of machine learning models that are trained to translate image data of a type of user interface to its interpreted meaning. The interpreted meaning can be normalized and then extraction configuration can be used in scaling that to the intended interface output. For example, the positions of a radial and/or linear dial may be trained so that a normalized position or angle of the dial can be detected through a neural network. Then the configured scale of the dial (e.g., linear/logarithmic, value range, etc.) can be used to convert the normalized position or angle to a data value. Other interfaces may be interpreted through deep learning where the visual appearance has a mapping to interpreted meaning. In the example above, the image of a dial may be classified as having a higher correlation to a set of images known to have a particular symbolic mapping.

The various types configurable extraction modes may have specific processing steps customized to interpreting each type of interface.

In a physical state detection mode, processing the image data associated with the device interface source into an extracted interface representation can include parameterizing visual physical state of the device interface source into an extracted interface representation. Parameterizing the visual physical state can include calculating size, tracking shape, tracking color profile, tracking orientation, tracking position within a region, and/or tracking other attributes of the physical state of an object. In some instances, the device interface source is static, in which case the physical state can be processed when the device interface source is visible. In other instances, the device interface source may apply physical state detection upon detecting presence of a particular object. The physical state properties that are parameterized may be conditional based on the present object in a region of the device interface source.

In an indicator detection mode, processing the image data associated with the device interface source into an extracted interface representation can include parameterizing the indicator state of at least one indicator signal. One preferred type of indicator is lighted indicator signal in which case the illumination state is parameterized, which may include parameterizing stable state of an indicator, parameterizing time varied states, parameterizing illumination qualities, and the like. This can include detecting an on and off state. There may additionally be other states. In one variation, the indicator state may be communicated through state variations over some window of time. For example, a certain number of flashes or rate of flashing can be detected and mapped to a configured state. Color, brightness, and other illumination qualities of an indicator may also be detected and classified as different states. An indicator detection mode may additionally be used for physical indicators like switches, buttons, graphical indicators. In one variation, multiple indicators may as a collection indicate different information, and parameterizing can include parameterizing the collective state of the indicators. For example, three indicator lights may turn on and off in different combinations to signal different information which could be interpreted through logic in the extraction configuration.

A switch extraction mode may be a type of indicator extraction. In a switch extraction mode, processing the image data associated with the device interface source into an extracted interface representation can include parameterizing the mechanical state of a switch. The switch will preferably have at least two mechanically stable states, but could alternatively have multiple stable states. Multiple switches could additionally be monitored to determine some logical state. With switches and indicators, the change in state at times may be of interest in addition to or as an alternative to just the stable state.

In a dial extraction mode, processing the image data associated with the device interface source into an extracted interface representation can include parameterizing the settings of a one dimensional dial. This functions to measure the position of a dial indicator relative to the operating range along one dimension. In a rotary dial this may include measuring the angle of the dial indicator. In a linear dial this may include measuring the position of the dial indicator along a linear path. Accordingly, this may include detecting the dial indicator and measuring position and/or orientation relative to the dial range. Dials can include dials that are set into a position by user input as well as dials that are set in response to some signal. The dial extraction mode can additionally be applied to many situations that don't involve a traditional dial such as treating the level of contents in a container or bottle as a dial indicator that moves linear along the path defined along the container. A multi-dimensional dial or user input like a joystick with two-dimensions of positioning or other element could additionally be extracted.

In a character extraction mode, processing the image data associated with the device interface source into an extracted interface representation can include performing optical character recognition in a designated region.

Related to character extraction, the method could additionally include other forms of graphical interpretation that more generally includes parameterizing graphical state of image data of the device interface source, which functions to interpret graphical presentation of information in an interface output. In a basic variation, this may be through identification and classification of static or animated graphics. Such graphic classification can enable graphical interpretation of non-alphanumeric symbols such as logos, icons, infographics, symbols, and/or other visual objects or patterns. Parameterizing graphical state, in one variation, may be used in parameterizing a chart (e.g., a line graph, pie chart, bar graph, or other form of infographic) into a dataset. In the variation of interpreting a chart, interpreting the graphical representation may include identifying a graphic type, detecting dimensions, identifying at least one data-set indicator, and generating at least one data-set value through comparison of a data-set indicator to the dimensions according to the graphic type. Graphic type can specify the rules for how data-sets and dimensions are represented and how a data-set indicator should be evaluated according to the dimensions. A pie chart will have rules on angular interpretation of wedges, and a line chart will have rules on interpretation of a line plotted along a two-dimensional axis. In the case of a medical monitoring device, a biological signal reflected as a line graph can be translated into a time series data-set.

In a presence extraction mode, processing the image data associated with the device interface source into an extracted interface representation can include detecting at least one type of object in a region specified in the extraction configuration. Detection of an object can include various forms of CV-based object detection. When dealing with people or more uniquely identifiable objects, presence extraction can be used for unique identification of objects. In the case of people, facial recognition, and/or other forms of biometric identification may be used. Presence detection mode may additionally include counting objects, measuring the quantity, timing the duration of presence, or generating other metrics related to object presence. Multiple types of objects may be detected. In some cases, presence extraction is used in detecting presence of some combination of objects in a region. Presence detection may additionally be accompanied by physical state detection.

In a device model extraction mode, processing the image data associated with the device interface source into an extracted interface representation can include detecting device state of the device interface source, and processing the image data according to a detected device state. The device model extraction mode functions to interpret device state of a device interface source. The device state is preferably detected according to a selected device model extraction mode set in the extraction configuration, wherein the selected device model extraction mode is on specifically for the particular device model of the device interface source. For example, each brand and model of heart monitoring device may have a different customized device model extraction mode to accommodate the different forms of data, device states, and device state transitions Processing the image data according to a detected device state can include selecting a type of informational data for characterization based on the detected device state. Depending on the device state, different data (or lack of data) may be exposed through the interface. Processing the image data according to the detected device state can additionally include extracting a parameterized representation of the device interface source from the image data and characterizing the parameterized representation into a labeled, informational data.

The device state will generally change the type and form of information presented by the device interface source. Device state can be detected by interpreting device state from device indicators, tracking user interactions, and/or other approaches. Device indicators may include physical indicators like buttons, switches, LEDs, dials, and the like. Device indicators may additionally include graphically displayed indicators such as GUI menu labels. In one variation, the method can include generating a device state model based on display images labeled as different device states. In this way small graphical styles of different device states (e.g., different applications, GUI widgets, and the like) can be efficiently learned and represented as a model for classification. In a particular device state information is preferably presented in different ways. Each device state may have different information that can be extracted. Maintaining a state machine of device state may additionally be used to associate information across different device states. For example, the method can interpret the navigation of a hierarchical menu in a modal operating system to understand classification of data extracted from a particular view.

Block S134, which includes analyzing the extracted interface output functions to perform post processing on the extracted interface representation. Depending on the application, different forms of analysis may be applied. More generally, basic analysis post-processing processes can be configurable such as averaging over a window, converting a rate of change or acceleration of a metric, or other basic processes. In some variations, the analysis may additionally include integrating with one or more other data sources, which may enable more in-depth analysis.

The various types of extraction can additionally include other processing features to account for different operating attributes of a device interface source. Indicator interfaces may also communicate information through a sequence of blinks. These sequences could be configured for detection, and block S130 could automatically detect these blinking conditions. Dial devices may offer the ability to move the dial continuously or more than a full rotation. Processing of a dial that is configured indicating such rotation range may be specifically tracked to account for being rotated beyond. Continuous tracking of the indicator may be used. Character based devices may operate with varying mechanics. A character-based display may scroll horizontally, scroll vertically, or cycle through messages. Such display changes could be automatically tracked and accounted for in the processing stage to create better-structured data. Other device mechanics could additionally be accounted for.

Additionally, during execution of the method, there may be gaps in the monitoring a device interface source. The device interface source may be undetectable because the view is blocked, the lighting conditions change, the device interface source is temporarily moved, or other complications. The method can preferably account for inconsistent data collection. The reason for a capture status change could be classified. Collected extracted interface representation data could be annotated indicating the capture status. Additionally, configuration for extraction of device interface source could be set to send a notification or issue an alert during particular capture status conditions.

Block S140, which includes applying the extracted interface representation, functions to utilize the information obtained from the device interface source. When integrated into an electronic device, the extracted interface representation is used by a control system in setting, augmenting or otherwise directing operation of one or more electronic devices. The method can enable the interactive coupling of a device interface source (used as a control interface) to an electronic device so that the device interface source can become another input to the operation of the electronic device. For a lighting fixture, a device interface source can become another switch or brightness setter. For a fan, a non-powered dial mounted on the wall could become a fan strength input. For a TV, a printed set of quick TV control actions could be mounted on the wall so that a user can quickly access commonly used commands.

Applying the extracted interface representation may additionally include exposing at least one access interface. Some implementations may additionally use data related to the extracted interface representation for various use cases. The exposed interface could be a user interface or a programmatic interface. The user interface could be accessed via a native application, a web application, or any suitable type of graphical, visual, or auditory user interface. Additionally, the user interface could be facilitated through a communication channel. Notifications and alerts could be triggered based on different conditions of the extracted interface representations. For example, an alert could be sent to one or more recipients in response to the classified interface representation satisfying some condition (e.g., heart rate dropping below a set value). A programmatic interface could be an application programming interface, a data communication protocol, a data storage solution, application processing routine, and/or any suitable mechanism enabling programmatic interactions. The programmatic interface can enable other applications and services to integrated with the interface extraction system.

In one implementation, the method may be used in combination with a programmatic event-handling system. The event-handling system may function to process the extracted interface representation and trigger a programmatic event upon detecting an event. Various event conditions could be monitored. The event conditions may be based in part on some aspect of the extracted interface representations. Then upon satisfying the condition a programmatic event could be initiated. In another implementation, the interface to the extracted interface representation(s) could be integrated with a home automation hub wherein various IoT devices could be collectively managed. In another implementation, a user interface for remotely monitoring the device interface source could be created. A wide variety of applications and tools could be constructed using the method.

The method may additionally include monitoring the capture status of a device interface source and generating feedback in response to a change of capture status of the device interface source, which functions to detect and respond to problems of a device interface source being lost from view, blocked, angled to prevent accurate extraction, or otherwise obscured in the field of view of the imaging device. The feedback is preferably applied to address the changes so that actions can be taken to resolve issues.

The capture status relates to the state of image data associated with device interface source that is used in processing. The capture status could be a binary status indicating if an extracted format can be generated. In another variation, the capture status could be a reliability metric. Under ideal lighting conditions and a clear view of the device interface source the reliability metric can have a high rating. As the lighting conditions become less ideal and/or the angle of the device interface source moves off center, the reliability metric may decline. At some level the capture status can indicate that a reliable extracted interface representation is not obtainable.

Audio interface elements could additionally have a capture status. Capture status may be impacted by background noise, the volume settings of the device, the orientation of a microphone of the interface extraction system, and/or other properties.

Generating feedback in block can be implemented in a variety of approaches. In one approach, the imaging device or another suitable device could generate user feedback. The user feedback could be an audio alert such as a sound or announcement. The user feedback could additionally or alternatively be a visual alert such as activating a status light. The user feedback can communicate the issues with the capture status. For example, an audio announcement may announce that the brightness settings of the display on a device need to be changed. In another example, a graphical display on an imaging device may indicate the "signal strength" based on the image data conditions.

In one preferred implementation, generating feedback can include announcing a change in capture status during user exit of the field of view. In this implementation, the method may additionally include tracking user presence in the field of view of the image data, which can enable detecting the user exit. In some cases, humans may commonly enter the field of view obscuring or altering the capture status of a device interface. While a human that causes the change is present in the field of view, the method can assume that the human is interacting with the device interface sources and performing the task of monitoring information from the device interface source. In other words, the method can temporarily delegate device interface source monitoring to a user when the user is in the vicinity of the device interface source. This can be particularly useful in a hospital use case where nurses and doctors will enter a patient's room, view the device interface sources, and interact with the device interface sources. The method may additionally be able to distinguish between different users. For example, the method can be configured to distinguish between hospital workers and other people (e.g., patients, patient family members, etc.). The appropriate users can be tracked through the image data (or other sources of location information like GPS or RF-based triangulation), and when the user leaves the proximity of the device interface source, the user can be alerted to any issues with the monitoring conditions.

Feedback may alternatively be generated and associated with data of the extracted interface representations. In cases where a device interface source is lost, the system can accommodate such gaps in information by flagging or annotating data. In some cases, the capture status could be a parameter associated with all extracted data formats. Similarly, the manner in which a device interface source was lost could be classified and used to flag or annotate the data. Classifications for lost device interface sources can include obscured device, lighting conditions, off-angle view, and device interface source disappearance.

To address possible changes in the capture status, the imaging device could be in close proximity to a device interface source to mitigate the chances of an object blocking view of the device interface source. In one variation, the imaging device can be mounted directly to the device interface source such that the relative position and orientation of the imaging device and the device interface source is fixed.

The method was primarily described as involving the use of a single camera of a single device interface source, but the method can be customized to work with multiple imaging devices and/or with multiple device interface sources.

In one variation, multiple imaging devices may be used to collect extracted interface representations of a device interface source. These different imaging devices may be used at distinct times or overlapping times. In one exemplary scenario, image data is captured by at least a first imaging device and a second imaging device; and processing the image data associated with the device interface source into an extracted interface representation can include processing image data collected from the first imaging device at a first instance into an extracted interface representation of the device interface source during the first instance and processing image data collected from the second imaging device at a second instance into an extracted interface representation of the device interface source during the second instance. For example, multiple lighting fixtures in a room may collectively monitor a set of light switches on the wall. Each can provide different points of view so that the best view of the light switch may be used if one lighting fixture cannot view the light switch.

The method is preferably operable for use with multiple device interface sources, wherein the method may include setting two or more device interface sources, and for each instance of extraction configuration of a device interface source, processing the image data associated with the respective device interface sources into extracted interface representations according to the respective extraction configuration. The extracted interface representations of the different device interface sources are preferably managed as separate and distinct data feeds (unless configured for merging). The exposed access interface may be used to access the extracted interface representations of select device interface sources or multiple device interface sources.

The method may additionally include detecting a candidate device interface source. In one variation, such automatic enrollment and configuration can be performed independent of any configured device position to enable on-demand extraction of data from a device interface source. The method actively captures image data and processes the image data for device interface source detection upon detection. Interface source detection can use CV-based object classification and detection techniques. When a device interface source is detected it can be processed according to an extraction configuration based the type of device interface source. Without configuring a device position the extracted interface representation may not be part of a larger historical record of the device interface source and instead provide a snap shot for the duration that device interface source was viewable. Alternatively, detection of a candidate device interface source can be used along with setting device position such that a historical record of that device interface source can be generated. Accordingly, the method shown in FIG. 37 can include detecting at least one type of device interface and automatically setting extraction configuration of a device interface upon detection of a type of device interface, wherein the extracting configuration sets device position to map to the image collection position.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system comprising:
   an electronic device with a controllable operating state;
   an imaging device that captures image data of an environment and that has an imaging resolution that isolates visual state of a targeted control interface in a field of view of the imaging device;
   a control interface that comprises a pairing identifier;
   a control system communicatively coupled to the imaging device and the electronic device, the control system comprising a visually monitored interface control mode with configuration to:
   identify the pairing identifier in the field of view of the image data and thereby detect the control interface,
   interpret a visual state of the control interface, and
   modulate the operating state in coordination with the visual state.

2. The system of claim 1, wherein there are at least two types of detectable control interfaces, and wherein a first type of control interface has a first set of visual states that are mapped to two distinct operating states and a second type of control interface that has a second set of visual states that are mapped to a range of operating states.

3. The system of claim 1, wherein the imaging device captures image data of an environment, wherein the control system comprises configuration to configure a sub-region of image data as a location of the control interface.

4. The system of claim 3, wherein the sub-region of the image data is automatically configured as the location of the control interface.

5. The system of claim 3, wherein the control system is further configured to detect a second control interface in a second sub-region of image data, interpret the visual state of the second control interface, and wherein modulation of the operating state is further modulated in coordination with the visual state of the second control interface.

6. The system of claim 1, wherein the imaging device comprises an optical system with a narrow field of view.

7. The system of claim 1, further comprising a pairing indicator that is configured to signal pairing state of the system.

8. The system of claim 1, wherein the control interface is a non-electric element.

9. The system of claim 1, wherein the control interface comprises at least one interaction region, wherein the interpretation of visual state comprises configuration to detect a user gesture within the interaction region, and wherein the a detected gesture and the interaction region map to a targeted operating state.

10. The system of claim 1, wherein the control system further comprises a pairing mode, wherein during a pairing mode, the control system is configured to detect the pairing identifier in a sub-region of the image data, and upon detection of the pairing identifier, register that sub-region for detection of a control interface.

11. The system of claim 1, wherein configuration to interpret a visual state of the control interface comprises configuration to detect a set of visual physical states of a control interface.

12. The system of claim 1, wherein configuration to interpret a visual state of the control interface comprises configuration to detect a visual gesture with an interaction region of the control interface.

13. The system of claim 1, further comprising an ambient activity sensor, and wherein the control system comprises activating the visually monitored interface control mode upon activation of the ambient activity sensor.

14. The system of 1, further comprising a directable housing that at least partially encases the imaging device and couples to the electronic device.

15. The system of claim 1, wherein the electronic device is a lighting device, and wherein the operating state is an illumination state of the lighting device.

16. The system of claim 15, wherein the control interface is a bi-stable light switch.

17. The system of claim 1, wherein the electronic device is a home automation hub, and wherein the operating state specifies the operating state of a set of connected devices.

18. The system of claim 1, wherein the electronic device comprises operating states comprising an on-state and an off-state.

19. A system comprising:
an electronic device with a controllable operating state;
an imaging device with an imaging resolution that isolates visual state of a targeted control interface in a field of view of the imaging device;
a control system communicatively coupled to the imaging device and the electronic device, the control system comprising a visually monitored interface control mode with configuration to:
interpret a visual state of the control interface, and
modulate the operating state in coordination with the visual state; and
the control system further comprising a pairing mode, wherein during a pairing mode, the control system is configured to detect a pairing identifier in a sub-region of the image data, and upon detection of the pairing identifier, register that sub-region for detection of the control interface.

20. The system of claim 19, wherein there are at least two types of detectable control interfaces, and wherein a first type of control interface has a first set of visual states that are mapped to two distinct operating states and a second type of control interface that has a second set of visual states that are mapped to a range of operating states.

21. The system of claim 19, wherein the sub-region of the image data is automatically configured as the location of the control interface.

22. The system of claim 19, wherein the control system is further configured to detect a second control interface in a second sub-region of image data, interpret the visual state of the second control interface, and wherein modulation of the operating state is further modulated in coordination with the visual state of the second control interface.

23. The system of claim 19, wherein the imaging device comprises an optical system with a narrow field of view.

24. The system of claim 19, further comprising a pairing indicator that is configured to signal pairing state of the system.

25. The system of claim 19, further comprising a control interface.

26. The system of claim 25, wherein the control interface is a non-electric element.

27. The system of claim 25, wherein the control interface comprises at least one interaction region, wherein the interpretation of visual state comprises configuration to detect a user gesture within the interaction region, and wherein a detected gesture and the interaction region map to a targeted operating state.

28. The system of claim 19, wherein configuration to interpret a visual state of the control interface comprises configuration to detect a set of visual physical states of a control interface.

29. The system of claim 19, wherein configuration to interpret a visual state of the control interface comprises configuration to detect a visual gesture with an interaction region of the control interface.

30. The system of claim 19, further comprising an ambient activity sensor, and wherein the control system comprises activating the visually monitored interface control mode upon activation of the ambient activity sensor.

31. The system of 26, further comprising a directable housing that at least partially encases the imaging device and couples to the electronic device.

32. The system of claim 19, wherein the electronic device is a lighting device, and wherein the operating state is an illumination state of the lighting device.

33. The system of claim 32, wherein the control interface is a bi-stable light switch.

34. The system of claim 19, wherein the electronic device is a home automation hub, and wherein the operating state specifies the operating state of a set of connected devices.

35. The system of claim 19, wherein the electronic device comprises operating states comprising an on-state and an off-state.

* * * * *